United States Patent [19]

Kurosawa

[11] Patent Number: 4,712,807

[45] Date of Patent: Dec. 15, 1987

[54] VEHICLE ACTIVE SUSPENSION SYSTEM INCORPORATING ACCELERATION DETECTING MEANS

[75] Inventor: Ryuichi Kurosawa, Toyota, Japan

[73] Assignee: Toyota Jidosha Kabushiki Kaisha, Toyota, Japan

[21] Appl. No.: 826,320

[22] Filed: Feb. 5, 1986

[30] Foreign Application Priority Data

Feb. 6, 1985 [JP] Japan .................... 60-021522
Dec. 26, 1985 [JP] Japan .................... 60-295943

[51] Int. Cl.⁴ .................................... B60G 17/00
[52] U.S. Cl. ............................ 280/707; 364/424
[58] Field of Search ............. 280/6 R, 6 H, 703, 707, 280/709, DIG. 1, 714; 188/299; 364/424

[56] References Cited

U.S. PATENT DOCUMENTS

| 2,992,837 | 7/1961 | Rabow | 280/709 |
| 3,035,853 | 5/1962 | Klien | 280/709 |
| 4,333,668 | 6/1982 | Hendrickson | 280/709 |

FOREIGN PATENT DOCUMENTS

| 0106697 | 4/1984 | European Pat. Off. |
| 2441172 | 5/1975 | Fed. Rep. of Germany |
| 2844413 | 4/1980 | Fed. Rep. of Germany |
| WO84/02886 | 8/1984 | World Int. Prop. O. |
| 2135020 | 8/1984 | United Kingdom |

OTHER PUBLICATIONS

Patent Abstracts of Japan, vol. 9, No. 202 (M-405) [1925], Aug. 20th 1985; and JP-A-60 064 014 (Nissan) 12-04-1985.

Patent Abstracts of Japan, vol. 8, No. 182 (M-319) [1619], Aug. 22th 1984; JP-A-59 073 313 (Toyo Kogyo) 25-04-1984.

*Primary Examiner*—John J. Love
*Assistant Examiner*—Karin L. Ferriter
*Attorney, Agent, or Firm*—Oblon, Fisher, Spivak, McClelland, & Maier

[57] ABSTRACT

A vehicle, which has a body and a plurality of wheels, has a suspension system which includes: an actuator for each wheel, each of which supports the body from one of wheels and is controllable to provide a variable force between the body and the wheel; a sensor for detecting acceleration of the body and for producing a signal representative thereof, a sensor for each wheel for detecting load acting between the body and the wheel and for producing a signal representative thereof; and a controller for inputting the signals representative of the acceleration of the body and the load on each wheel, for calculating based thereupon fluctuations in load acting between the wheels and the body, for controlling the actuators to increase or decrease forces provided thereby between the body and the wheels, and for operating by feedback action by comparing the actual fluctuation in the force between the respective wheel and the body as sensed by the load sensor for the wheel with the calculated value therefor, and for bringing the difference between the two values to be zero. Optionally, the acceleration sensor can include either a means for sensing lateral acceleration or a means for sensing roll angle acceleration or both of these; and in the latter case this control means can utilize for control either the lateral acceleration information or the roll angle information, depending on whether the signs of these accelerations are opposite or are the same, respectively.

12 Claims, 5 Drawing Figures

VEHICLE ACTIVE SUSPENSION SYSTEM INCORPORATING ACCELERATION DETECTING MEANS

BACKGROUND OF THE INVENTION

The present invention relates to the field of vehicle suspensions, and more specifically relates to an active type suspension for a vehicle such as an automobile.

In a conventional type of suspension for a vehicle such as an automobile, with the object of damping the shock input from the road surface to the vehicle wheel and transmitted to the vehicle body and further of improving the comfort of the ride of the vehicle, typically suspension springs are incorporated which support the weight of the vehicle and allow a relative movement principally in the vertical direction between the vehicle wheel and vehicle body, thus absorbing the road shocks as positional energy by elastic deformation. The load on such a suspension spring, that is, the load acting between a particular vehicle wheel and the vehicle body, is determined mechanically by the weight of the vehicle body (the proportion thereof which is resting upon this spring) and the relative positional relation between the particular vehicle wheel and the vehicle body, and this fluctuates according to the running state of the vehicle. For example, when the vehicle is turning, or during sharp acceleration or deceleration, the vehicle body is urged by its own inertia relative to the vehicle wheel, and as a result the load acting between the vehicle wheel and the vehicle body changes, the elastic deformation amount of the suspension spring changes, and undesirable swaying or changes in attitude such as roll or nose dive are typically produced.

Techniques conventionally applied in order to reduce the swaying and attitude changes of the vehicle, and in order to ensure stable driving characteristics, include the incorporation of stabilizers in the suspension for a vehicle such as an automobile, and the provision of progressive spring characteristics for the suspension spring. Since, however, these techniques only passively reduce the vehicle swaying or attitude change, the swaying or attitude change of the vehicle cannot be satisfactorily completely reduced. In order moreover to ensure a satisfactory ride for the vehicle while improving driving stability by the above methods, there is required complicated calculation and design of the suspension structure, and fine tuning of the suspension springs and shock absorbers is necessary. Accordingly, in the case of wear over a long service life, the proper stability of the vehicle cannot be assured.

As an active vibration damping method and device for a wheeled vehicle such as an automobile, there has been disclosed in Japanese Patent Laid Open Publication No. Sho 54-55913 (1979), which it is not intended hereby to admit as prior art to the present application except to the extent otherwise mandated by law, a system in which, in a vehicle in which the vehicle body mass is disposed above the mass of each of a number of vehicle wheels with a servo cylinder for producing a force operated by a valve interposed therebetween, characterised in that the valve is an electrohydraulic valve driven by an eletrohydraulic means, and as measurement signals for this purpose are used the relative spacing between the vehicle body and vehicle wheel, the relative velocity during relative motion of the vehicle body and vehicle wheel, and the pressure difference in the servo cylinder. Since, however, this method and device presuppose relative displacement between vehicle body and vehicle wheel, it is not possible by this method and device to maintain a substantially constant vehicle attitude.

SUMMARY OF THE INVENTION

The present invention considers the problems of the above type in a conventional suspension for a vehicle such as an automobile, and has as its main object the provision of an improved active suspension for a vehicle which, irrespective of the running state of the vehicle, in other words even when the vehicle is turning or during sharp acceleration or deceleration, prevents large swaying of the vehicle body, maintains the attitude of the vehicle body substantially constant, and thereby improves the ride characteristics and the driving stability of the vehicle.

It is a further object of the present invention to provide such a suspension system for a vehicle, which is able well to cope with the effects of side winds such as gusts.

It is a yet further object of the present invention to provide such a suspension system for a vehicle, which is able to discriminate between the effects of traveling around a curve and the effects of a side wind.

It is a yet further object of the present invention to provide such a suspension system for a vehicle, which is able to be set to provide proper steering characteristics of understeering, neutral steering, or oversteering.

It is a yet further object of the present invention to provide such a suspension system for a vehicle, which is able to set such proper steering characteristics of understeering, neutral steering, or oversteering, independently in the case of traveling around a curve and of suffering the effects of a side wind.

According to the present invention, these and other objects are accomplished by a suspension system for a vehicle comprising a body and a plurality of wheels, comprising: a plurality of actuators, each of which supports said body from one of said wheels and is controllable to provide a variable force between said body and said wheels; a sensor means for detecting acceleration of said body and for producing a signal representative thereof; and a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels; and also the present invention is accomplished by a suspension system for a vehicle comprising a body and a plurality of wheels, comprising: a plurality of actuators, each of which supports said body from one of said wheels and is controllable to provide a variable force between said body and said wheels; a sensor means for detecting acceleration of said body and for producing a signal representative thereof; for each said wheel, load sensor means for detecting the value of the load between said wheel and said body and for outputting a signal representative thereof; and a control means for inputting said signal representative of said acceleration of said body from said sensor means and said signals representative of load from said plurality of load sensor means, for calculating based thereupon fluctuations in load acting between said wheels and said body caused by said acceleration, for controlling said actuators to increase or decrease forces provided thereby between said body and said wheels, and for operating by feedback action by comparing the actual fluctuation in the force between the respective wheel of each said actuator and said body as sensed by said load sensor means for said wheel with the calculated value therefor, and for bringing the difference between said values to be zero.

In the case where as described above the vehicle is moving with an acceleration, for example when the vehicle is turning, or during sharp acceleration or deceleration, the vehicle body is urged by its own inertia relative to the vehicle wheel, and as a result the load acting between the vehicle wheel and the vehicle body changes, and here the magnitude of the fluctuation in the load is proportional to the inertia force acting of the vehicle body, and therefore to the acceleration of the vehicle body, and whether the load increases or decreases is determined by the direction of the acceleration. It is therefore possible to determine the magnitude and sign of the fluctuation of the load acting between each vehicle wheel and the vehicle body by detecting the acceleration of the vehicle body. According to the present invention, the acceleration of the vehicle body is detected by an acceleration detecting means, the magnitude of the fluctuation of the load acting between each vehicle wheel and the vehicle body is calculated by a control means based on the acceleration of the vehicle body as determined from the acceleration signal from the acceleration detection means, based on the calculation results a plurality of actuators interposed between each of the vehicle wheels and the vehicle body and supporting the respective wheels with respect to the vehicle body are controlled, through the actuators the force acting between the corresponding vehicle wheel and the vehicle body is increased or decreased, and as a result swaying or changes in attitude of the vehicle body due to the inertial force of the vehicle body can be prevented both before the event and in a positive manner, and by this means irrespective of the running conditions of the vehicle the attitude of the vehicle body can be maintained in an appropriate state, and improved ride characteristics and driving stability for the vehicle can be obtained.

According to one aspect of the invention, since there is a proportionality relationship between the magnitude of the vehicle body acceleration (inertia) and the fluctuation in the load acting between each vehicle wheel and the vehicle body as a result thereof, the control means inputs the acceleration signal from said acceleration detecting means, calculates from said acceleration signal the magnitude of the fluctuation in load acting between each vehicle wheel and said vehicle body caused by the acceleration of said vehicle body, controls each actuator by the open loop method based on the calculation results, and through said actuators increases or decreases the force acting between the corresponding vehicle wheel and said vehicle body.

According to another aspect of the invention, in order to obtain appropriate control of each actuator in response to acceleration of the vehicle body, the active suspension of the present invention is constructed to carry out feedback control by comparing the actual fluctuation in the force borne by each actuator detected by a plurality of load detecting means detecting the force borne by each actuator and the fluctuation in the load acting between each vehicle wheel and said vehicle body calculated by said calculation control means, and causes their difference to be zero, whereby it is possible to control yet more accurately the attitude of the vehicle body.

Further, according to another aspect of the present invention, there is provided a suspension system for a vehicle comprising a body and two front and two rear wheels, comprising: a plurality of actuators, each of which supports said body from one of said wheels and is controllable to provide a variable force between said body and said wheels; a sensor means, comprising a means for detecting acceleration of said vehicle body in the lateral direction thereof and a means for detecting roll angle acceleration of said vehicle body; and a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels, comprising a means for: (a) detecting whether or not the direction of lateral acceleration of said body as determined by said lateral acceleration detecting means is the same as or is the opposite to the direction of roll acceleration of said body as considered for a point above the center of gravity of said vehicle; and for: (b) if said directions are the same, calculating, based upon said signal representative of said roll angle acceleration of said body from said sensor means therefor, the magnitude of the total fluctuation in load acting between said front and said rear wheels on each side and said body caused by said acceleration, performing a distribution calculation on said total fluctuation between said front and said rear wheels according to a certain ratio, and based thereupon controlling said actuators to increase or decrease forces provided thereby between said body and said wheels; and for: (c) if said directions are opposite, calculating, based upon said signal representative of said lateral acceleration of said body from said sensor means therefor, the magnitude of the total fluctuation in load acting between said wheels and said body caused by said acceleration, performing a distribution calculation on said total fluctuation between said front and said rear wheels according to said certain ratio, and based thereupon controlling said actuators to increase or decrease forces provided thereby between said body and said wheels. This concept allows the vehicle steering characteristics during turning or suffering wind to be set to understeering, neutral steering, or oversteering, as desired.

In, however, the last mentioned above mentioned proposed active suspension, the ratio of the supporting forces with respect to the vehicle body produced by the actuators between front and rear wheels is always the same, as a result of which, if in order to improve the steering stability while the vehicle is turning the ratio between the front and rear wheels of the supporting forces is set such as to make the steering characteristics optimal when the vehicle is turning, it is difficult to make the steering stability optimal while the vehicle is subject to a side wind, and on the contrary if in order to improve the steering stability while the vehicle is subject to a side wind, the ratio between the front and rear wheels of the supporting forces is set such as to make the steering characteristics optimal when the vehicle is subject to a side wind, it is difficult to make the steering stability optimal while the vehicle is turning and to obtain a satisfactory steering stability.

Thus, according to an alternative aspect of the present invention, there is provided a suspension system for a vehicle comprising a body and two front and two rear wheels, comprising: a plurality of actuators, each of which supports said body from one of said wheels and is controllable to provide a variable force between said body and said wheels; a sensor means, comprising a means for detecting acceleration of said vehicle body in the lateral direction thereof and a means for detecting roll angle acceleration of said vehicle body; and a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels, comprising a means for: (a) detecting whether or not the direction of lateral acceleration of said body as determined by said lateral acceleration detecting means is the same as or is the opposite to the direction of roll acceleration of said body as considered for a point above the center of gravity of said vehicle; and for: (b) if said directions are the same, calculating, based upon said signal representative of said roll angle acceleration of said body from said sensor means therefor, the magnitude of the total flunctuation in load acting between said front and said rear wheels on each side and said body caused by said acceleration, performing a distribution calculation on said total fluctuation between said front and said rear wheels according to a first ratio, and based thereupon controlling said actuators to increase or decrease forces provided thereby between said body and said wheels; and for: (c) if said directions are opposite, calculating, based upon said signal representative of said lateral acceleration of said body from said sensor means therefor, the magnitude of the total fluctuation in load acting between said wheels and said body caused by said acceleration, performing a distribution calculation of said total fluctuation between said front and said rear wheels according to a second ratio, and based thereupon controlling said actuators to increase or decrease forces provided thereby between said body and said wheels.

Thus when the vehicle is turning or the vehicle is subject to a side wind the attitude of the vehicle body can be maintained in an appropriate attitude, in the cases where the vehicle is turning or the vehicle is subject to a side wind the ratios of the supporting forces of front and rear wheels can be set mutually independently and can be set to appropriate ratios, whereby the steering characteristics in each case can be optimised, and thus a desirable rideability of the vehicle and stability of the steering can be obtained.

It should be noted that, since if the ratio of the supporting force of the rear wheels to the supporting force of the front wheels exceeds unity the vehicle steering characteristics will be understeer, while if said ratio is less then unity the vehicle steering characteristics will by oversteer, the first ratio of the active suspension of this aspect of the present invention may be set to an arbitrary ratio according to the steering characteristics required by the vehicle while turning, while it is desirable for the second ratio that in order to provide a relatively strong understeer for the steering characteristics of the vehicle and improve the running stability of the vehicle when subjected to a gust, it should be set to a ratio such that the ratio of the supporting force of the front wheels with respect to the supporting force of the rear wheels is a value relatively large compared with unity.

BRIEF DESCRIPTION OF THE DRAWINGS

The present invention will now be shown and described with regard to certain of the preferred embodiments thereof, and with reference to the illustrative drawings, which however should not be considered as limitative of the present invention in any way, since the scope of the present invention is to be considered as being delimited solely by the accompanying claims, rather than by any particular features of the disclosed embodiments or of the drawings. In these drawings:

DESCRIPTION OF THE PREFERRED EMBODIMENTS

Figure 1:
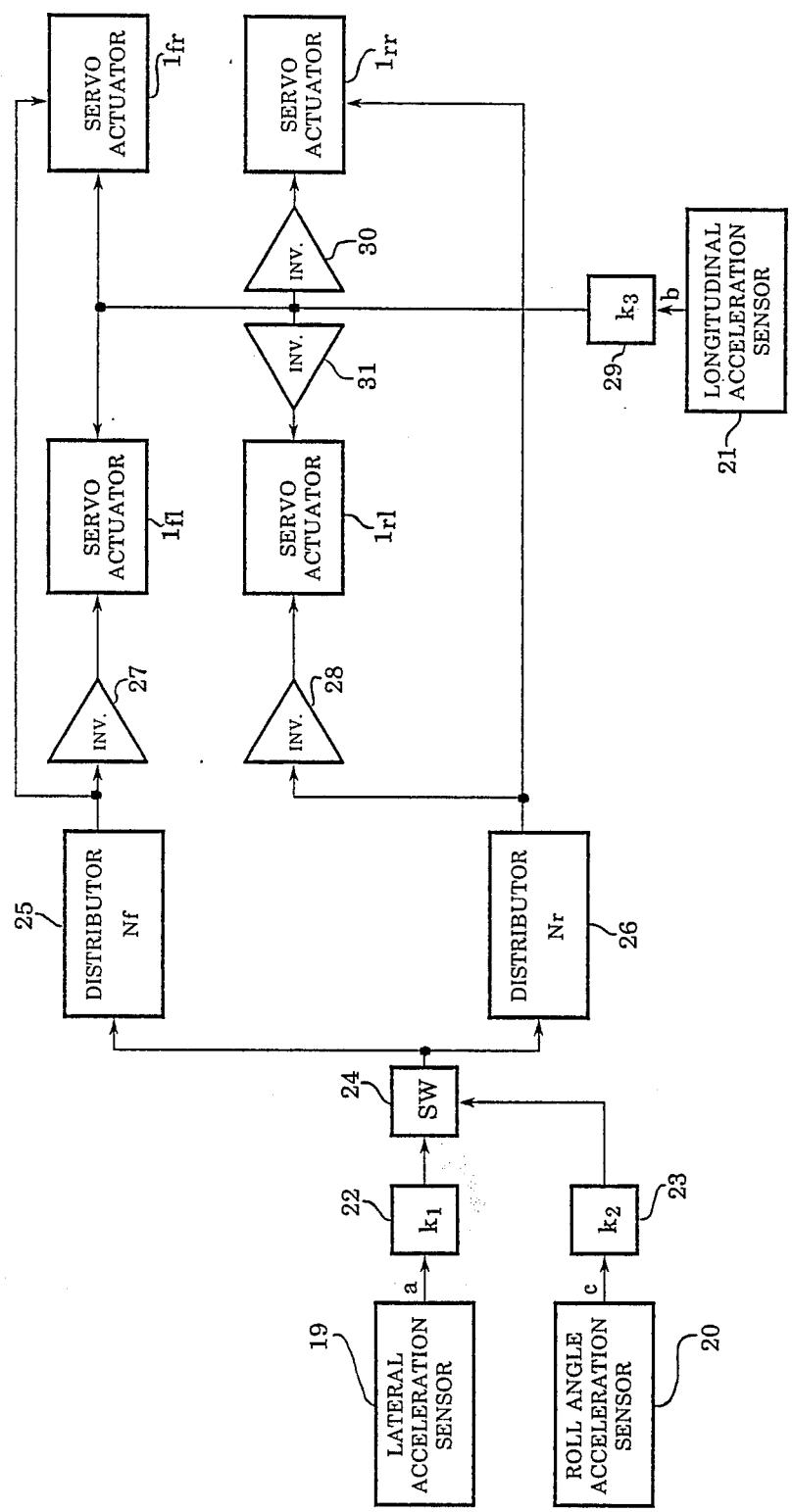
FIG. 1 is a block diagram showing the overall construction of the first preferred embodiment of the suspension system of the present invention.

The present invention will now be described with reference to the preferred embodiments thereof. FIG. 1 shows the overall construction of the first preferred embodiment of the suspension system of the present invention. In this figure, which is a block diagrammatical view, the reference numerals 1 denote servo actuators for the four wheels of an automobile, not itself particularly shown; and in FIG. 2 an exemplary one of these servo actuators 1 is shown in detail, also in block diagrammatical view, along with its associated wheel, which is denoted as 2.

Figure 2:
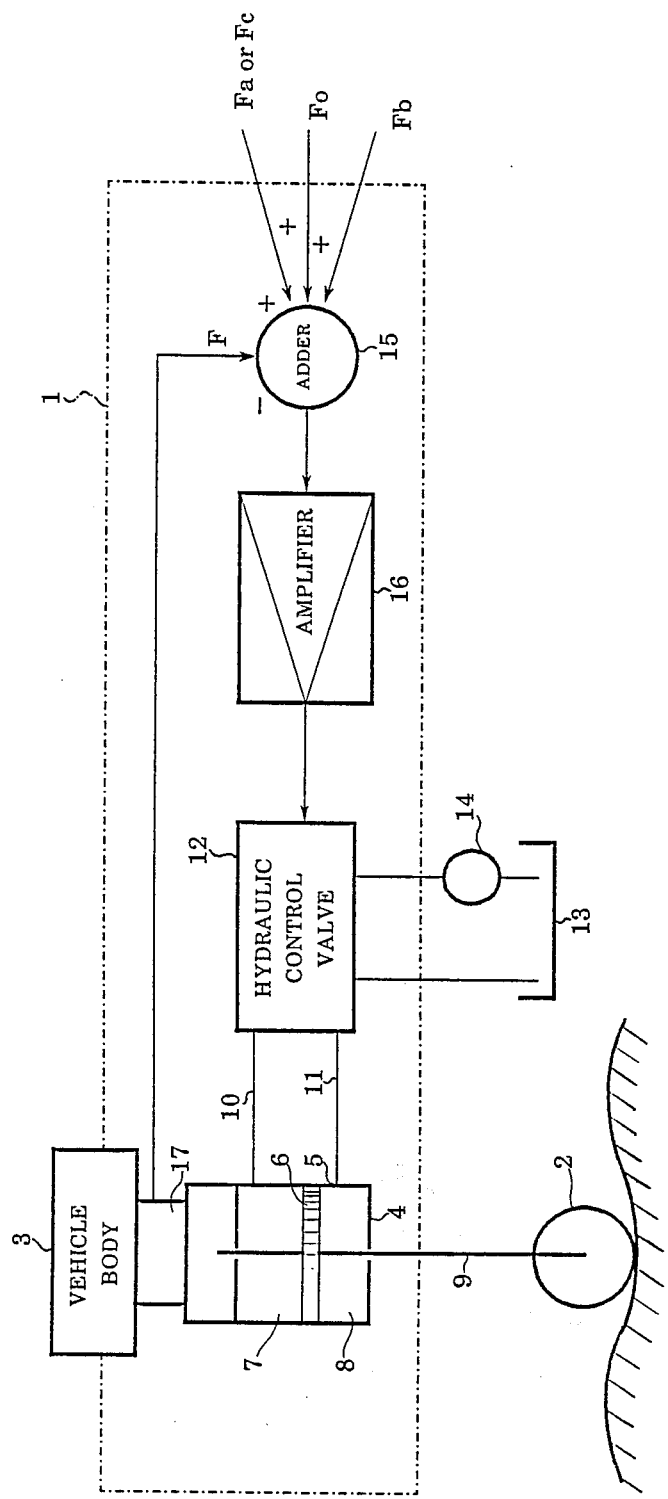
FIG. 2 is a block diagram showing in detail an exemplary one of four servo actuators which suspend the wheels of the vehicle from the body thereof.

Referring to FIG. 1, the four servo actuators for the four wheels of the vehicle are therein referred to as $1fl$, $1fr$, $1rl$, and $1rr$: the servo actuator $1fr$ is the actuator for the front right wheel of the vehicle, the servo actuator $1fl$ is the actuator for the front left wheel of the vehicle, the servo actuator $1rr$ is the actuator for the rear right wheel of the vehicle, and the servo actuator $1rl$ is the actuator for the rear left wheel of the vehicle. As seen in FIG. 2, each of these actuators 1 comprises a drive unit 4 which is mounted between the relevant vehicle wheel 2 and the body of the vehicle, designated as 3, and exerts a variable force to bias the wheel 2 downwards with respect to the body 3, so as to provide suspension action. The drive unit 4 is, in the shown first preferred embodiment, a hydraulic type cylinder-piston device, and comprises a cylinder 5 with a piston 6 slidably inserted into it, so that said piston 6 can move with respect to said cylinder 5 substantially only in their mutual longitudinal direction. The cylinder 5 and the piston 6 together define upper and lower pressure chambers 7 and 8 on opposite sides of said piston 6, and these chambers are made to be substantially liquid tight by means of seals or the like, not particularly shown. A rod 9 couples the piston 6 to a support member (not shown) for the particular vehicle wheel 2 corresponding to this cylinder-piston device 4 with respect to movement in the vertical direction, said wheel 2 being of course rotatable with respect to the rod 9 and the vehicle body 3 as a whole about an axis substantially perpendicular to the drawing paper in FIG. 2. And the cylinder 5 is mounted to the vehicle body 3 so as to be substantially immovable with respect thereto.

In the shown first preferred embodiment, the construction is such that the rod 9 passes, not only of course downwards in the figure out of the lower pressure chamber 8 through a seal (not particularly shown) to be connected to the mounting member for the vehicle wheel, but also upwards in the figure out of the upper pressure chamber 7 through another seal (also not shown) to remain free. This is in order that the effective pressure receiving area of the piston 6 presented to the upper pressure chamber 7 should be equal to the effective pressure receiving area of said piston 6 presented to the lower pressure chamber 8, which ensures that the force exerted on the piston 6 is proportional to the difference between the pressures in said upper and lower pressure chambers 7 and 8. In another variant construction, however, it would be quite possible for the rod 9 not to extend upwards in the figure above the piston 6, and not to be substantially continued within the upper pressure chamber 7 at all. This would mean that the effective pressure receiving area of the piston 6 presented to the upper pressure chamber 7 would be somewhat greater than the effective pressure receiving area of said piston 6 presented to the lower pressure chamber 8, which would mean that the force exerted on the piston 6 in the downward direction in the figure would be proportional to the pressure in said upper pressure chamber 7, with a somewhat greater proportionality constant, than the proportionality constant with which the force exerted on the piston 6 in the upward direction in the figure would be proportional to the pressure in said lower pressure chamber 8. The present invention would still be applicable to such a construction, mutatis mutandis.

The upper pressure chamber 7 is connected by a hydraulic conduit 10 to an electrical-hydraulic servo valve 12, and similarly the lower pressure chamber 8 is connected by another hydraulic conduit 11 to said electrical-hydraulic servo valve 12. Hereinafter the pressure within the upper pressure chamber 7 will be referred to as P1, and the pressure within the lower pressure chamber 8 will be referred to as P2; and virtually always during the operation of the vehicle as a matter of course P1 is greater than P2; in order properly to support the vehicle above the road surface. The electrical-hydraulic servo valve 12 may be of a construction which is per se known, and exemplarily functions by receiving a constant supply of high pressure hydraulic fluid produced by a hydraulic fluid pressurizing device 14 such as a pump which sucks up said hydraulic fluid from a sump 13, then passing said pressurized hydraulic fluid through an internal variable orifice, said fluid finally being returned back to said sump 13; in any case, functionally, this electrical-hydraulic servo valve 12, via the conduits 10 and 11, controls the pressure difference (P1−P2) between the pressures in the upper and lower chambers 7 and 8 to be any arbitrary desired value, according to a control signal which said electrical-hydraulic servo valve 12 receives.

In the shown first preferred embodiment, this control signal is an electrical voltage signal, and is furnished, via an amplifier 16, from an adder 15. As will be described in detail hereinafter, when the control voltage signal supplied from said adder 15 to the electrical-hydraulic servo valve 12 is substantially zero, (which as will be seen later is the case where the signals inputted to the adder 15 are such that $F=F0$ and $Fa=Fb=Fc=0$), then said electrical-hydraulic servo valve 12 controls the pressure difference (P1−P2) between the pressures in the upper and lower chambers 7 and 8 of the cylinder-piston device 4 so as to cause the product of said pressure difference (P1−P2) multiplied by the effective pressure receiving area of the piston 6 (which product in general is the force exerted by said cylinder-piston device 4) to be substantially equal to the portion of the weight of the vehicle which is imposed on this particular wheel 2 when the vehicle is stationary and level. These weight portions will hereinafter be referred to as Pfr, Pfl, Prr, and Prl, respectively corresponding to the front right wheel, the front left wheel, the rear right wheel, and the rear left wheel of the vehicle. On the other hand, when the control voltage signal supplied from the adder 15 to the electrical-hydraulic servo valve 12 is positive or negative, respectively, then said pressure difference (P1−P2) is increased or is decreased respectively, and by an amount corresponding to the absolute value of said voltage.

Between each of the drive units 4 and the vehicle body 3 there is fitted a load sensor 17, which detects the load force acting between said one of said drive units 4 and said vehicle body, i.e. the amount of load currently being borne by the corresponding vehicle wheel 2, and outputs a signal representative thereof, which in this shown first preferred embodiment of the present invention is a voltage signal F and is inputted to a minus terminal of the adder 15. It should be noted that, as alternative possibilites for other embodiments, the drive units 4 could be connected in reverse to the arrangement shown in FIG. 2, with the rod 9 being connected to the vehicle body and with the cylinder 5 being connected to the support member for the vehicle wheel 2. The hydraulic fluid pressurizing device 14 and the sump 13 also may of course be common to all the four drive units 4 for the four vehicle wheels 2, and the hydraulic fluid utilized may be oil or may be some other fluid, provided that said fluid is substantially incompressible.

Referring again to FIG. 1, 19 is a lateral acceleration sensor, 20 is a roll angle acceleration sensor, and 21 is a longitudinal acceleration sensor. All of these are provided at locations at or close to the center of gravity of the vehicle body. The lateral acceleration sensor 19 detects the current value of the lateral acceleration of the vehicle and outputs a signal "a" representative thereof; the roll angle acceleration sensor 20 detects the current value of the roll angle acceleration of the vehicle and outputs a signal "c" representative thereof; and the longitudinal acceleration sensor 21 detects the current value of the longitudinal acceleration of the vehicle and outputs a signal "b" representative thereof. In the shown first preferred embodiment, in fact, these signals are electrical voltage signals, and: the signal "a" output by the lateral acceleration sensor 19 has an absolute magnitude proportional to the lateral acceleration of the vehicle, and is positive or negative according as to whether said vehicle is being accelerated to the right or the left respectively as seen from the rear of the vehicle; the signal "c" output by the roll angle acceleration sensor 20 has an absolute magnitude proportional to the roll angle acceleration of the vehicle, and is positive or negative according as to whether said vehicle is being accelerated in the clockwise direction or the anticlockwise direction respectively, again as seen from the rear of the vehicle; and the signal "b" output by the longitudinal acceleration sensor 21 has an absolute magnitude proportional to the longitudinal acceleration of the vehicle, and is positive or negative according as to whether said vehicle is being accelerated forwards or backwards, respectively.

The signals a and c respectively outputted from the lateral acceleration sensor 19 and from the roll angle acceleration sensor 20 are respectively multiplied by the factors k1 and k2 in amplifiers 22 and 23 respectively, to produce signals of values a.k1 and c.k2 respectively, and these resultant signals are inputted to a changeover switch 24. This changeover switch 24, as will be explained in detail hereinbelow, passes selectively one of these input signals while intercepting the other, and the selected signal is then fed to the inputs of two distributors 25 and 26. These distributors 25 and 26 cooperate so as to distribute the signal inputted to them both as output signals with a voltage ratio Nf:Nr, where Nf and Nr are both positive and $Nf+Nr=1$.

The output signal of the distributor Nf is fed directly to the servo actuator 1fr for the front right vehicle wheel (actually as an input to an add terminal of the adder 15 thereof, as suggested in FIG. 2) and also via an inverter or NOT gate 27 to the servo actuator 1fl for the front left vehicle wheel (again, actually, as an input to an add terminal of the adder 15 thereof). And, similarly, the output signal of the distributor Nr is fed directly to the servo actuator 1rr for the rear right vehicle wheel (similarly, actually as an input to an add terminal of the adder 15 thereof) and also via an inverter 28 to the servo actuator 1rl for the rear left vehicle wheel (yet again, actually as an input to an add terminal of the adder 15 thereof). In other words, the output signal of the distributor Nf is equal to Nf.a.k1 or to Nf.c.k2, depending upon the setting of the changeover switch 24, while the output signal of the distributor Nr is similarly equal either to Nr.a.k1 or to Nr.c.k2; and accordingly, if the changeover switch 24 is set so as to pass the signal from the lateral acceleration sensor 19 while intercepting the signal fron the roll angle acceleration sensor 20, then the signal fed to the plus terminal of the adder 15 of the servo actuator 1fr for the front right vehicle wheel is equal to Nf.a.k1, the signal fed to the plus terminal of the adder 15 of the servo actuator 1fl for the front left vehicle wheel is equal to −Nf.a.k1, the signal fed to the plus terminal of the adder 15 of the servo actuator 1rr for the rear right vehhicle wheel is equal to Nr.a.k1, and the signal fed to the plus terminal of the adder 15 of the servo actuator 1rl for the rear left vehicle wheel is equal to −Nr.a.k1. On the other hand, if the changeover switch 24 is set the other way, so as to intercept the signal from the lateral acceleration sensor 19 while passing the signal from the roll angle acceleration sensor 20, then the signal fed to the plus terminal of the adder 15 of the servo actuator 1fr for the front right vehicle wheel is equal to Nf.c.k2, the signal fed to the plus terminal of the adder 15 of the servo actuator 1fl for the front left vehicle wheel is equal to −Nf.c.k2, the signal fed to the plus terminal of the adder 15 of the servo actuator 1rr for the rear right vehicle wheel is equal to Nr.c.k2, and the signal fed to the plus terminal of the adder 15 of the servo actuator 1rl for the rear left vehicle wheel is equal to −Nr.c.k2. In any case, this value inputted to this plus terminal of each adder 15 is designated as "Fa or Fc" in FIG. 2.

Further, the signal outputted from the longitudinal acceleration sensor 21 is multiplied by the factor k3 in an amplifier 29, to produce a signal of value b.k.3, and this resultant signal is directly inputted to another plus terminal of each of the two adders 15 of the servo actuators 1fr for the front right vehicle wheel and 1fl for the front left vehicle wheel, while further said signal, after being inverted by the inverters 30 and 31 respectively, is inputted to another plus terminal of each of the two adders 15 of the servo actuators 1rr for the rear right vehicle wheel and 1rl for the rear left vehicle wheel. In any case, this value inputted to this plus terminal of each adder 15 is designated as "Fb" in FIG. 2.

Further, to another plus terminal of each of the adders 15 for the four servo actuators 1fr, 1fl, 1rr, and 1rl for the four vehicle wheels, there is supplied a constant voltage signal F0 (the value of F0 varies between the vehicle wheels) of magnitude corresponding to the portion of the weight of the vehcle which is imposed on the corresponding wheel 2 when the vehicle is stationary or moving at a constant velocity and is level, i.e. to the values Pfr, Pfl, Prr, and Prl respectively corresponding to the front right wheel, the front left wheel, the rear right wheel, and the rear left wheel defined hereinabove.

The amplifiers 22 and 23, the distributors 25 and 26, the inverters 27 and 28, the amplifier 28, the inverters 30 and 30, and the adder 15 and the amplifier 16 of each of the four servo actuators 1fr, 1fl, 1rr, and 1rl for the four vehicle wheels may all themselves be per se known components, and in combination with the changeover switch 24, described below, they constitute a calculating control system which, as will be described in detail hereinbelow, functions by calculating, based upon the output signals from the lateral acceleration sensor 19, the roll angle acceleration sensor 29, and the longitudinal acceleration sensor 21 and the load sensors 17 for the four wheels, the fluctuation in load acting between each vehicle wheel 2 and the body 3 of the vehicle due to the acceleration of the vehicle body, and based upon the results of these calculations, outputs appropriate control signals to the four electrical-hydraulic servo valves 12. The amplification factors k1, k2, and k3 appropriate for the amplifiers 22, 23, and 29 are constants which may for example be determined in any particular practical example by calculation or by experiment.

Figure 3:
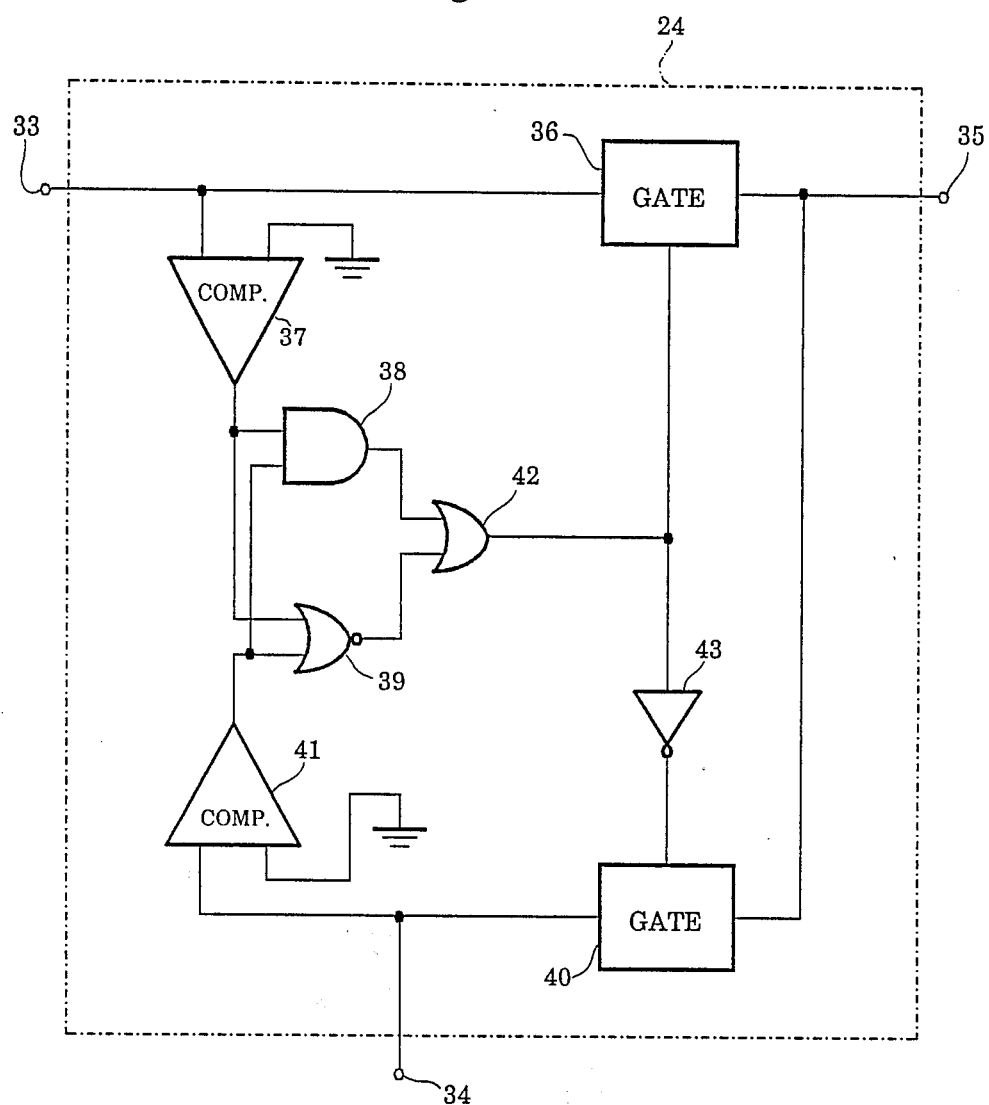
FIG. 3 is a block diagram showing the detailed construction of a changeover switch which is shown in FIG. 1 only as a block.

Now, the details of the structure and function of the changeover switch 24 will be explained, with reference to the block diagram thereof shown in FIG. 3. This switch 24 has three terminals 33, 34, and 35; the terminal 33 is connected to the output of the amplifier 22, the terminal 34 is connected to the output of the amplifier 23, and the terminal 35 is connected to the inputs of the distributors 25 and 26. The signal inputted to the input terminal 33 from the amplifier 22 is inputted to a gate 36 and to a comparator 37. Similarly, the signal inputted to the input terminal 34 from the amplifier 23 is inputted to a gate 40 and to a comparator 41. The other inputs of the comparators 37 and 41 are supplied with a standard voltage for comparison of said input signals therewith; in the shown preferred embodiment, this voltage is just ground voltage. The output of the comparator 37 is fed both to an input terminal of an AND gate 38 and also to an input terminal of a NOR gate 39. Similarly, the output of the other comparator 41 is fed both to the other input terminal of said AND gate 38 and also to the other input terminal of said NOR gate 39. The outputs of said AND gate 38 and said NOR gate 39 are fed to the inputs of an OR gate 42, whose output is fed directly to control the gate 36 and via an inverter or NOT gate 43 to control the other gate 40. Thus it is seen that exactly one of the two gates 36 and 40 is open at any time. The outputs of the two gates 36 and 40 are coupled together and are fed to the output terminal 35 to be supplied to the inputs of the distributors 25 and 26 as mentioned above.

This changeover switch 24 operates as will now be explained, to feed the signal received at one and only one of the input terminals 33 and 34 to the output terminal 35 and thence to the distributors 25 and 26. The signal from the amplifier 22 input through the input terminal 33 is compared with a signal of zero voltage value in the comparator 37, and, if and only if said input signal is greater than said zero signal (i.e. is positive) then the output of said comparator 37 is a ON signal. Similarly, the signal from the amplifier 23 input through the input terminal 34 is compared with a signal of zero voltage value in the comparator 41, and, if and only if said input signal is greater than said zero signal (i.e. is positive) then the output of said comparator 41 is a ON signal. The output signals from the two comparators 37 and 41 are fed as input signals to the AND gate 38, and only in the case that both said output signals are ON is an ON signal outputted from said AND gate 38. Similarly, said output signals from said two comparators 37 and 41 are likewise fed as input signals to the NOR gate 39, and only in the case that both said output signals are OFF is an ON signal outputted from said NOR gate 39. Accordingly, only in the case that the signs of both the input signals fed to the input terminals 33 and 34 of this changeover switch 24 are the same, i.e. that said input signals are both positive or are both negative, is either of the two inputs of the OR gate 42 provided with an ON signal. Thus, when the signs of both the input signals fed to the input terminals 33 and 34 agree, the output of the OR gate 42 is an ON signal, and this causes the gate 36 to be opened while, because of the inverting action of the NOT gate 43, the other gate 40 is closed. In this case, the input signal fed to the input terminal 33 is supplied to the output terminal 35, while the input signal fed to the other input terminal 34 is intercepted. On the other hand, when the signs of the input signals fed to the input terminals 33 and 34 disagree, one being positive and the other negative, the output of the OR gate 42 is an OFF signal, and this causes the gate 36 to be closed while the other gate 40 is opened. In this case, the input signal fed to the input terminal 34 is supplied to the output terminal 35, while the input signal fed to the input terminal 33 is intercepted.

Thus, in summary, this changeover switch 24 supplies the signal of value $a.k1$ from the output of the amplifier 22 to the inputs of the distributors 25 and 26, when the sign of the signal from the lateral acceleration sensor 19 and the sign of the signal from the roll angle acceleration sensor 20 agree, and on the other hand supplies the signal of value $c.k2$ from the output of the amplifier 23 to the inputs of the distributors 25 and 26, when the sign of said signal from said lateral acceleration sensor 19 and the sign of said signal from said roll angle acceleration sensor 20 differ.

Referring to FIG. 2, the adder 15 for the drive unit 4 for each of the vehicle wheels 2: (a) receives at its minus terminal the signal F of voltage magnitude corresponding to the actual load force acting between said one of said drive units 4 and said vehicle body, i.e. the amount of load currently being borne by the corresponding vehicle wheel 2, outputted by the corresponding load sensor 17; and further receives at its three plus terminals: (b) the signal F0 of voltage magnitude corresponding, as stated above, to the portion of the weight of the vehicle which is imposed on the corresponding wheel 2 when the vehicle is stationary; (c) the signal Fb which is equal to either plus or minus the value $b.k3$, according as to which wheel is involved, as explained above; and (d) the signal "Fa or Fc", which, according as to whether or not the signs of the values a and c for the vehicle lateral acceleration and the vehicle roll angle acceleration agree or not, either is equal to either plus or minus either the value $Nf.a.k1$ or the value $Nr.a.k1$ according as to which wheel is involved, or alternatively is equal to either plus or minus either the value $Nf.c.k2$ or the value $Nr.c.k2$ again according as to which wheel is involved. Therefore, the pressure difference (P1−P2) between the pressures in the upper and lower chambers 7 and 8 of each drive unit 4 for each vehicle wheel 2 is controlled by a feedback process, so as to bring the value F to be equal to Fb+F0+"Fa or Fc" (as above for the relevant wheel).

In an alternative possible embodiment, not particularly discussed herein because based upon the explanation in this specification the details thereof will be clear to one of ordinary skill in the relevant art without undue explanation, the control of F could be performed by open loop control, and in such a case the load sensor 17 and the input path for the signal F0 could be omitted, without departing from the principle of the present invention.

Now, the operation of this first preferred embodiment of the present invention in various different operational circumstances will be explained.

First, if the vehicle is stationary or is moving at a constant velocity, then the lateral acceleration, the roll angle acceleration, and the longitudinal acceleration of the vehicle body 3 are all zero, and therefore the outputs of the sensors 19, 20, and 21 are all zero. Accordingly, the signals in the FIG. 1 structure are all zero, and for each wheel 2, referring to FIG. 2, the signals "Fa or Fc" and "Fb" in the drive unit 4 therefor are both zero. Further, since the force F sensed by the load sensor is substantially equal to the standard force F0 for that wheel, therefore the output of the adder 15 is substantially zero, and thus the signal transmitted through the amplifier 16 to the electrical-hydraulic servo valve 12 is substantially zero. Thereby, by the above described system of feedback control, the pressure difference (P1−P2) between the pressures in the upper and lower chambers 7 and 8 of each drive unit 4 for each vehicle wheel 2 is maintained substantially at the respective one of the constant values Pfr, Pfl, Prr, and Prl defined above, and thus the attitude of the vehicle body is maintained in a predetermined appropriate state. Now, if in this operational condition, while the vehicle is running at a constant velocity, one of the wheels runs over a bump or other road obstruction, then the force received by said wheel from the road surface will temporarily change; but in this case, also, the pressure difference (P1−P2) sustained in the drive unit 4 for this vehicle wheel 2 will be maintained constant, and therefore the force produced between this drive unit 4 and the vehicle body 3, in other words the supporting force for the vehicle body, is also maintained constant. Therefore, the position of the piston 6 of this drive unit 4 will change relative to the cylinder 5 thereof, according to change of the vertical position of the vehicle wheel 2 as it passes over the bump, but the vertical position of the portion of the vehicle body 3 to which this drive unit 4 is attached will not change, and accordingly the attitude of the vehicle will remain in its abovementioned predetermined appropriate state.

Next, the case that the vehicle is turning around a curve will be explained. In this case, so called centrifugal force (of course not actually a force) acts on the body 3 of the vehicle in the direction radially outwards to the turn, and thereby the vehicle body will roll in the direction outwards to the turn. Thus, lateral acceleration IS detected by the lateral acceleration sensor 19 and similarly roll angle acceleration is detected by the roll angle acceleration sensor 20. In this case, the magnitude of the fluctuation of the load acting between each vehicle wheel 2 and the vehicle body 3 will be independent of the direction of turning of the vehicle and will be substantially proportional to the acceleration of the vehicle body. Also, with respect to an arbitrary portion of the vehicle body 3 above the center of gravity of said vehicle body, the direction of the vehicle lateral acceleration (the centripetal acceleration) and the direction of the roll angle acceleration will be mutually opposite. As a result of this, the signs of the output signals from the amplifiers 22 and 23 of the FIG. 1 structure which are input to the changeover switch 24 will be the same, and therefore in this case the signal Fa based upon the signal a outputted from the lateral acceleration sensor 19 is inputted via the distributors 25 and 26 after appropriate modification thereby to the adder of each of the servo actuators 1, with as explained above its sign being reversed for the servo actuators 1$fl$ and 1$rl$ while being left undisturbed for the servo actuators 1$fr$ and 1$rr$; while on the other hand the signal Fc which is based upon the signal c outputted from the roll angle acceleration sensor 20 is intercepted.

Thus, if the vehicle is turning to the left, then the direction of the acceleration of the vehicle body 3 is, as seen from the rear of the vehicle, to the left, and further the direction of the roll angle acceleration of said vehicle body 3 is, also as seen from the rear of the vehicle, clockwise—in other words, from the point of view of any part of the vehicle body 3 above the center of gravity thereof, is to the right; and accordingly the signal a outputted by the lateral acceleration sensor 19 and also the signal c outputted by the roll angle acceleration sensor 20 will both be positive. Accordingly, in this case, the signal Fa equal to a.k1 based upon said signal a outputted from the lateral acceleration sensor 19 as amplified by the amplifier 22, which is a positive signal, is the one which is inputted, via the changeover switch 24 and via the distributors 25 and 26 after appropriate modification thereby, in two cases as further modified by the inverters 27 and 28, to the adder 15 of each of the four servo actuators 1 for the four vehicle wheels, while on the other hand the signal Fc equal to c.k2 based upon the signal c outputted from the roll angle acceleration sensor 20 as amplified by the amplifier 23 is the one which is intercepted at said changeover switch 24. In more detail, this positive signal a.k1 is modified by the distributor 25 for the front wheels by multiplication by the factor Nf, so that a positive signal Fa of value a.k1.Nf is supplied to the adder 15 of the drive unit 4 of the servo actuator 1$fr$ for the front right wheel 2, thus causing the pressure difference (P1−P2) between the pressures in the upper and lower chambers 7 and 8 of this front right drive unit 4 for this front right vehicle wheel 2 to be increased from the value Pfr by an amount corresponding to the value of the lateral acceleration a of the vehicle body 3, i.e. corresponding to the increase in load acting between this front right wheel 2 and the vehicle body 3, according to the operation of the electrical-hydraulic servo valve 12 of this front right drive unit 4. On the other hand, this same signal of value a.k1.Nf is inverted by the inverter 27 to produce a negative signal Fa of value −a.k1.Nf which is supplied to the adder 15 of the drive unit 4 of the servo actuator 1$fl$ for the front left wheel 2, thus causing the pressure difference (P1−P2) between the pressures in the upper and lower chambers 7 and 8 of this front left drive unit 4 for this front left vehicle wheel 2 to be decreased from the value Pfl, again by an amount corresponding to the value of the lateral acceleration a of the vehicle body 3, i.e. corresponding to the decrease in load acting between this front left wheel 2 and the vehicle body 3, according to the operation of the electrical-hydraulic servo valve 12 of this front left drive unit 4. This operation of the two front drive units 4 substantially prevents the front of the vehicle from undergoing roll action during this left turn. Similarly, the same signal a.k1 is modified by the distributor 26 for the rear wheels by multiplication by the factor Nr, so that a positive signal Fa of value a.k1.Nr is supplied to the adder 15 of the drive unit 4 of the servo actuator 1$rr$ for the rear right wheel 2, thus causing the pressure difference (P1−P2) between the pressures in the upper and lower chambers 7 and 8 of this rear right drive unit 4 for this rear right vehicle wheel 2 to be increased from the value Prr by an amount corresponding to the value of the lateral acceleration a of the vehicle body 3, i.e. corresponding to the increase in load acting between this rear right wheel 2 and the vehicle body 3, according to the operation of the electrical-hydraulic servo valve 12 of this rear right drive unit 4. On the other hand, this same signal of value a.k1.Nr is inverted by the inverter 28 to produce a negative signal Fa of value −a.k1.Nr which is supplied to the adder 15 of the drive unit 4 of the servo actuator 1$rl$ for the rear left wheel 2, thus causing the pressure difference (P1−P2) between the pressures in the upper and lower chambers 7 and 8 of this rear left drive unit 4 for this rear left vehicle wheel 2 to be decreased from the value Prl, again by an amount corresponding to the value of the lateral acceleration a of the vehicle body 3, i.e. corresponding to the decrease in load acting between this rear left wheel 2 and the vehicle body 3, according to the operation of the electrical-hydraulic servo valve 12 of this rear left drive unit 4. This operation of the two rear drive units 4 thus likewise substantially prevents the rear of the vehicle from undergoing roll action in the clockwise direction as seen from the rear of the vehicle during this left turn.

On the other hand, if the vehicle is turning to the right, then the direction of the acceleration of the vehicle body 3 is, as seen from the rear of the vehicle, to the right, and further the direction of the roll angle acceleration of said vehicle body 3 is, also as seen from the rear of the vehicle, anticlockwise—in other words, from the point of view of any part of the vehicle body 3 above the center of gravity thereof, is to the left; and accordingly the signal a outputted by the lateral acceleration sensor 19 and also the signal c outputted by the roll angle acceleration sensor 20 will both be negative. Accordingly, again in this case, the signal Fa equal to a.k1 based upon said signal a outputted from the lateral acceleration sensor 19 as amplified by the amplifier 22, which is in this case a negative signal, is the one which is inputted, via the changeover switch 24 and via the distributors 25 and 26 after appropriate modification thereby, in two cases as further modified by the inverters 27 and 28, to the adder 15 of each of the four servo actuators 1 for the four vehicle wheels, while on the other hand the signal Fc equal to c.k2 based upon the signal c outputted from the roll angle acceleration sensor 20 as amplified by the amplifier 23 again is the one which is intercepted at said changeover switch 24. In more detail, this negative signal a.k1 is modified by the distributor 25 for the front wheels by multiplication by the factor Nf, so that a negative signal Fa of value a.k1.Nf is supplied to the adder 15 of the drive unit 4 of the servo actuator 1$fr$ for the front right wheel 2, thus causing the pressure difference (P1−P2) between the pressures in the upper and lower chambers 7 and 8 of this front right drive unit 4 for this front right vehicle wheel 2 to be decreased from the value Pfr by an amount corresponding to the value of the lateral acceleration a of the vehicle body 3, i.e. corresponding to the decrease in load acting between this front right wheel 2 and the vehicle body 3, according to the operation of the electrical-hydraulic servo valve 12 of this front right drive unit 4. On the other hand, this same signal of value a.k1.Nf is inverted by the inverter 27 to produce a positive signal Fa of value −a.k1.Nf which is supplied to the adder 15 of the drive unit 4 of the servo actuator 1$fl$ for the front left wheel 2, thus causing the pressure difference (P1−P2) between the pressures in the upper and lower chambers 7 and 8 of this front left drive unit 4 for this front left vehicle wheel 2 to be increased from the value Pfl, again by an amount corresponding to the value of the lateral acceleration a of the vehicle body 3, i.e. corresponding to the increase in load acting between this front left wheel 2 and the vehicle body 3, according to the operation of the electrical-hydraulic servo valve 12 of this front left drive unit 4. This operation of the two front drive units 4 substantially prevents the front of the vehicle from undergoing roll action during this right turn. Similarly, the same negative signal a.k1 is modified by the distributor 26 for the rear wheels by multiplication by the factor Nr, so that a negative signal Fa of value a.k1.Nr is supplied to the adder 15 of the drive unit 4 of the servo actuator 1$rr$ for the rear right wheel 2, thus causing the pressure difference (P1−P2) between the pressures in the upper and lower chambers 7 and 8 of this rear right drive unit 4 for this rear right vehicle wheel 2 to be decreased from the value Prr by an amount corresponding to the value of the lateral acceleration a of the vehicle body 3, i.e. corresponding to the decrease in load acting between this rear right wheel 2 and the vehicle body 3, according to the operation of the electrical-hydraulic servo valve 12 of this rear right drive unit 4. On the other hand, this same signal of value a.k1.Nr is inverted by the inverter 28 to produce a positive signal Fa of value −a.k1.Nr which is supplied to the adder 15 of the drive unit 4 of the servo actuator 1$rl$ for the rear left wheel 2, thus causing the pressure difference (P1−P2) between the pressures in the upper and lower chambers 7 and 8 of this rear left drive unit 4 for this rear left vehicle wheel 2 to be increased from the value Prl, again by an amount corresponding to the value of the lateral acceleration a of the vehicle body 3, i.e. corresponding to the increase in load acting between this rear left wheel 2 and the vehicle body 3, according to the operation of the electrical-hydraulic servo valve 12 of this rear left drive unit 4. This operation of the two rear drive units 4 thus likewise substantially prevents the rear of the vehicle from undergoing roll action in the anticlockwise direction as seen from the rear of the vehicle during this right turn.

By setting the distribution ratio between the signals from the distributors 25 and 26, i.e. the ratio Nf:Nr, appropriately, it is possible appropriately to tailor the steering characteristics of the vehicle while it is turning. Specifically, if this ratio Nf:Nr is set equal to unity, so that Nf=Nr=0.5, then the fluctuation in load acting between the vehicle wheels and the vehicle body as a result of the centrifugal force acting upon the vehicle will be borne equally by the front wheels and by the rear wheels, and the vehicle steering characteristics will be substantially neutral. Further, if this ratio Nf:Nr is set equal to greater than unity, so that Nf is greater than 0.5 and Nr is less than 0.5, then the fluctuation in load acting between the vehicle wheels and the vehicle body as a result of the centrifugal force acting upon the vehicle will be borne more by the front wheels than by the rear wheels, and the vehicle steering characteristics will be those of understeer. On the other hand, if the ratio Nf:Nr is set equal to less than unity, so that Nf is less than 0.5 and Nr is greater than 0.5, then the fluctuation in load acting between the vehicle wheels and the vehicle body as a result of the centrifugal force acting upon the vehicle will be borne less by the front wheels than by the rear wheels, and the vehicle steering characteristics will be those of oversteer.

Next, the case that the vehicle is subjected to a relatively strong sideways force such as a gust of wind will be explained. In this case, the vehicle body 3 is driven in the downwind or lee direction by the pressure of the wind upon it, and thus a roll effect is obtained, with the upper part of said vehicle body 3 moving relative to the center of gravity thereof in said downwind direction. Therefore, the vehicle body 3 behaves substantially in the same way as when subjected to centrifugal force when the vehicle is turning around a curve. In this case, the fluctuation in the load acting between the vehicle wheels 2 and the vehicle body 3 is proportional to the pressure force due to the side wind acting upon said vehicle body 3, and therefore is substantially proportional to the roll angle acceleration of said vehicle body 3. Whereas, however, when the vehicle is turning around a curve, the direction of the vehicle lateral acceleration as detected by the vehicle lateral acceleration sensor 19 is the same as the direction of the vehicle roll angle acceleration as detected by the vehicle roll angle acceleration sensor 20 as described above, on the other hand, when the vehicle is suffering from being blown sideways by a gust of wind or the like, these directions are opposite. Thus, by comparing the sign of the output signal a of the vehicle lateral acceleration sensor 19 and the sign of the output signal c of the vehicle roll angle acceleration sensor 20, as described above with respect to the operation of the changeover switch 24, it is possible to detect whether the vehicle is turning around a curve or is being blown sideways by a gust of wind, according as to whether or not, respectively, these signs agree. Further, when the vehicle is being blown sideways by a gust of wind, the amount of movement of the vehicle body 3 in the downwind direction is very small, but on the other hand the fluctuation in the load acting between the vehicle wheels 2 and the vehicle body 3 is substantial and is proportional to the pressure force due to the side wind acting upon said vehicle body 3, i.e. is proportional to the roll angle acceleration of said vehicle body 3 which is substantial. Therefore, in this case, it is desirable that the regulation of the pressure difference (P1−P2) between the pressures in the upper and lower chambers 7 and 8 of each of the drive units 4 for each of the vehicle wheels 2 should be performed based upon the value of the roll angle acceleration of the vehicle body 3, not upon the value of the lateral acceleration thereof.

Thus, if the vehicle is subjected to a gust of wind coming from its left side, then the direction of the acceleration of the vehicle body 3 is, as seen from the rear of the vehicle, to the right, and further the direction of the roll angle acceleration of said vehicle body 3 is, also as seen from the rear of the vehicle, clockwise—in other words, from the point of view of any part of the vehicle body 3 above the center of gravity thereof, is to the right; and accordingly the signal a outputted by the lateral acceleration sensor 19 will be negative, while the signal c outputted by the roll angle acceleration sensor 20 will be positive. Accordingly, in this case, the signal Fc equal to c.k2 based upon the signal c outputted from the roll angle acceleration sensor 20 as amplified by the amplifier 23, which is a positive signal, is the one which is inputted, via the changeover switch 24 and via the distributors 25 and 26 after appropriate modification thereby, in two cases as further modified by the inverters 27 and 28, to the adder 15 of each of the four servo actuators 1 for the four vehicle wheels, while on the other hand the signal Fa equal to a.k1 based upon said negative signal a outputted from the lateral acceleration sensor 19 as amplified by the amplifier 22 is the one which is intercepted at said changeover switch 24. In more detail, this positive signal c.k2 is modified by the distributor 25 for the front wheels by multiplication by the factor Nf, so that a positive signal Fc of value c.k2.Nf is supplied to the adder 15 of the drive unit 4 of the servo actuator 1$fr$ for the front right wheel 2, thus causing the pressure difference (P1−P2) between the pressures in the upper and lower chambers 7 and 8 of this front right drive unit 4 for this front right vehicle wheel 2 to be increased from the value Pfr by an amount corresponding to the value of the roll angle acceleration c of the vehicle body 3, i.e. corresponding to the increase in load acting between this front right wheel 2 and the vehicle body 3, according to the operation of the electrical-hydraulic servo valve 12 of this front right drive unit 4. On the other hand, this same signal of value c.k2.Nf is inverted by the inverter 27 to produce a negative signal Fc of value −c.k2.Nf which is supplied to the adder 15 of the drive unit 4 of the servo actuator 1$fl$ for the front left wheel 2, thus causing the pressure difference (P1−P2) between the pressures in the upper and lower chambers 7 and 8 of this front left drive unit 4 for this front left vehicle wheel 2 to be decreased from the value Pfl, again by an amount corresponding to the value of the roll angle acceleration c of the vehicle body 3, i.e. corresponding to the decrease in load acting between this front left wheel 2 and the vehicle body 3, according to the operation of the electrical-hydraulic servo valve 12 of this front left drive unit 4. This operation of the two front drive units 4 substantially prevents the front of the vehicle from undergoing roll action during the impact of this gust from the left side of the vehicle. Similarly, the same positive signal c.k2 is modified by the distributor 26 for the rear wheels by multiplication by the factor Nr, so that a positive signal Fc of value c.k2.Nr is supplied to the adder 15 of the drive unit 4 of the servo actuator 1$rr$ for the rear right wheel 2, thus causing the pressure difference (P1−P2) between the pressures in the upper and lower chambers 7 and 8 of this rear right drive unit 4 for this rear right vehicle wheel 2 to be increased from the value Prr by an amount corresponding to the value of the roll angle acceleration c of the vehicle body 3, i.e. corresponding to the increase in load acting between this rear right wheel 2 and the vehicle body 3, according to the operation of the electrical-hydraulic servo valve 12 of this rear right drive unit 4. On the other hand, this same signal of value c.k2.Nr is inverted by the inverter 28 to produce a negative signal Fc of value −c.k2.Nr which is supplied to the adder 15 of the drive unit 4 of the servo actuator 1$rl$ for the rear left wheel 2, thus causing the pressure difference (P1−P2) between the pressures in the upper and lower chambers 7 and 8 of this rear left drive unit 4 for this rear left vehicle wheel 2 to be decreased from the value Prl, again by an amount corresponding to the value of the roll angle acceleration c of the vehicle body 3, i.e. corresponding to the decrease in load acting between the rear left wheel 2 and the vehicle body 3, according to the operation of the electrical-hydraulic servo valve 12 of this rear left drive unit 4. This operation of the two rear drive units 4 thus likewise substantially prevents the rear of the vehicle from undergoing roll action in the clockwise direction as seen from the rear of the vehicle during this impact of a gust from the left side of the vehicle.

On the other hand, if the vehicle is subjected to a gust of wind coming from its right side, then the direction of the acceleration of the vehicle body 3 is, as seen from the rear of the vehicle, to the left, and further the direction of the roll angle acceleration of said vehicle body 3 is, also as seen from the rear of the vehicle, anticlockwise—in other words, from the point of view of any part of the vehicle body 3 above the center of gravity thereof, is to the left; and accordingly the signal a outputted by the lateral acceleration sensor 19 will be positive, while the signal c outputted by the roll angle acceleration sensor 20 will be negative. Accordingly, in this case, again the signal Fc equal to c.k2 based upon the signal c outputted from the roll angle acceleration sensor 20 as amplified by the amplifier 23, which is a negative signal, is the one which is inputted, via the changeover switch 24 and via the distributors 25 and 26 after appropriate modification thereby, in two cases as further modified by the inverters 27 and 28, to the adder 15 of each of the four servo actuators 1 for the four vehicle wheels, while on the other hand the signal Fa equal to a.k1 based upon said positive signal a outputted from the lateral acceleration sensor 19 as amplified by the amplifier 22 is the one which is intercepted at said changeover switch 24. In more detail, this negative signal c.k2 is modfied by the distributor 25 for the front wheels by multiplication by the factor Nf, so that a negative signal Fc of value c.k2.Nf is supplied to the adder 15 of the drive unit 4 of the servo actuator 1$fr$ for the front right wheel 2, thus causing the pressure difference (P1−P2) between the pressures in the upper and lower chambers 7 and 8 of this front right drive unit 4 for this front right vehicle wheel 2 to be decreased from the value Pfr by an amount corresponding to the value of the roll angle acceleration c of the vehicle body 3, i.e. corresponding to the decrease in load acting between this front right wheel 2 and the vehicle body 3, according to the operation of the electrical-hydraulic servo valve 12 of this front right drive unit 4. On the other hand, this same signal of value c.k2.Nf is inverted by the inverter 27 to produce a positive signal Fc of value −c.k2.Nf which is supplied to the adder 15 of the drive unit 4 of the servo actuator $1fl$ for the front left wheel 2, thus causing the pressure difference (P1−P2) between the pressures in the upper and lower chambers 7 and 8 of this front left drive unit 4 for this front left vehicle wheel 2 to be increased from the value Pfl, again by an amount corresponding to the value of the roll angle acceleration c of the vehicle body 3, i.e. corresponding to the increase in load acting between this front left wheel 2 and the vehicle body 3, according to the operation of the electrical-hydraulic servo valve 12 of this front left drive unit 4. This operation of the two front drive units 4 substantially prevents the front of the vehicle from undergoing roll action during the impact of this gust from the right side of the vehicle. Similarly, the same negative signal c.k2 is modified by the distributor 26 for the rear wheels by multiplication by the factor Nr, so that a negative signal Fe of value c.k2.Nr is supplied to the adder 15 of the drive unit 4 of the servo actuator $1rr$ for the rear right wheel 2, thus causing the pressure difference (P1−P2) between the pressures in the upper and lower chambers 7 and 8 of this rear right drive unit 4 for this rear right vehicle wheel 2 to be decreased from the value Prr by an amount corresponding to the value of the roll angle acceleration c of the vehicle body 3, i.e. corresponding to the decrease in load acting between this rear right wheel 2 and the vehicle body 3, according to the operation of the electrical-hydraulic servo valve 12 of this rear right drive unit 4. On the other hand, this same signal of value c.k2.Nr is inverted by the inverter 28 to produce a positive signal Fc of value −c.k2.Nr which is supplied to the adder 15 of the drive unit 4 of the servo actuator $1rl$ for the rear left wheel 2, thus causing the pressure difference (P1−P2) between the pressures in the upper and lower chambers 7 and 8 of this rear left drive unit 4 for this rear left vehicle wheel 2 to be increased from the value Prl, again by an amount corresponding to the value of the roll angle acceleration c of the vehicle body 3, i.e. corresponding to the increase in load acting between this rear left wheel 2 and the vehicle body 3, according to the operation of the electrical-hydraulic servo valve 12 of this rear left drive unti 4. This operation of the two rear drive units 4 thus likewise substantially prevents the rear of the vehicle from undergoing roll action in the anticlockwise direction as seen from the rear of the vehicle during this impact of a gust from the right side of the vehicle.

Next, the case that the vehicle is accelerating or is decelerating will be explained. In the case of vehicle acceleration, the vehicle body 3 performs a motion with acceleration in the longitudinal direction of the vehicle, and a so called inertial force (in reality of course not a force) acts upon the vehicle body in the direction opposite to the direction of motion thereof, i.e. in the rearwards direction. As a result of this, the loads acting between both the left and the right front wheel and the vehicle body are diminished, while on the other hand the loads acting between both the left and the right rear wheel and the vehicle body are increased. This tends to cause vehicle squat. On the other hand, in the case of vehicle deceleration, the vehicle body 3 performs a motion with deceleration in the longitudinal direction of the vehicle, and a so called inertial force acts upon the vehicle body in the direction of motion thereof, i.e. in the forwards direction. As a result of this, the loads acting between both the left and the right front wheel and the vehicle body are increased, while on the other hand the loads acting between both the left and the right rear wheel and the vehicle body are diminished. This tends to cause vehicle nosediving. In both of these cases, irrespective of whether the vehicle is accelerating or is decelerating, the fluctuations in the loads acting between the vehicle wheels and the vehicle body are substantially proportional to the value of the acceleration of the vehicle body.

Thus, if the vehicle is accelerating, then the signal b outputted by the longitudinal acceleration sensor 21 will be negative, and this signal, after modification by being amplified by the factor k3 by the amplifier 29, is fed, in two cases as further modified by the inverters 30 and 31, to the adder 15 of each of the four servo actuators 1 for the four vehicle wheels. In more detail, this negative signal b.k3 is supplied to the adder 15 of the drive unit 4 of the servo actuator $1fr$ for the front right wheel 2, thus causing the pressure difference (P1−P2) between the pressures in the upper and lower chambers 7 and 8 thereof to be decreased from the value Pfr by an amount corresponding to the value of the longitudinal acceleration b of the vehicle body 3, i.e. corresponding to the decrease in load acting between this front right wheel 2 and the vehicle body 3. Similarly, this same negative signal of value b.k3 is supplied to the adder 15 of the drive unit 4 of the servo actuator $1fl$ for the front left wheel 2, thus causing the pressure difference (P1−P2) between the pressures in the upper and lower chambers 7 and 8 of this front left drive unit 4 to be similarly decreased from the value Pfl, again by an amount corresponding to the value of the longitudinal acceleration b of the vehicle body 3, i.e. corresponding to the decrease in load acting between this front left wheel 2 and the vehicle body 3. On the other hand, this negative signal b.k3 is inverted by the inverter 30 to produce a positive signal Fb of value −b.k3 which is supplied to the adder 15 of the drive unit 4 of the servo actuator $1rr$ for the rear right wheel 2, thus causing the pressure difference (P1−P2) between the pressures in the upper and lower chambers 7 and 8 of this rear right drive unit 4 to be increased from the value Prr by an amount corresponding to the value of the longitudinal acceleration b of the vehicle body 3, i.e. corresponding to the increase in load acting between this rear right wheel 2 and the vehicle body 3. Similarly, this same negative signal of value b.k3 is inverted by the inverter 31 to produce a positive signal Fb of value −b.k3 which is supplied to the adder 15 of the drive unit 4 of the servo actuator $1rl$ for the rear left wheel 2, thus causing the pressure difference (P1−P2) between the pressures in the upper and lower chambers 7 and 8 of this rear left drive unit 4 to be similarly increased from the value Prl, again by an amount corresponding to the value of the longitudinal acceleration b of the vehicle body 3, i.e. correponding to the increase in load acting between this rear left wheel 2 and the vehicle body 3. This operation of the front and the rear drive units 4 thus substantially prevents the vehicle from undergoing squat action during this acceleration condition.

On the other hand, if the vehicle is decelerating, then the signal b outputted by the longitudinal acceleration sensor 21 will be positive, and this signal, after modification by being amplified by the factor k3 by the amplifier 29, is fed, in two cases as further modified by the inverters 30 and 31, to the adder 15 of each of the four servo actuators 1 for the four vehicle wheels. In more detail, this positive signal b.k3 is supplied to the adder 15 of the drive unit 4 of the servo actuator $1fr$ for the front right wheel 2, thus causing the pressure difference (P1−P2)

between the pressures in the upper and lower chambers 7 and 8 thereof to be increased from the value Pfr by an amount corresponding to the value of the longitudinal acceleration b of the vehicle body 3, i.e. corresponding to the increase in load acting between this front right wheel 2 and the vehicle body 3. Similarly, this same positive signal of value b.k3 is supplied to the adder 15 of the drive unit 4 of the servo actuator 1fl for the front left wheel 2, thus causing the pressure difference (P1−P2) between the pressures in the upper and lower chambers 7 and 8 of this front left drive unit 4 to be similarly increased from the value Pfl, again by an amount corresponding to the value of the longitudinal acceleration b of the vehicle body 3, i.e. corresponding to the increase in load acting between this front left wheel 2 and the vehicle body 3. On the other hand, this positive signal b.k3 is inverted by the inverter 30 to produce a negative signal Fb of value −b.k3 which is supplied to the adder 15 of the drive unit 4 of the servo actuator 1rr for the rear right wheel 2, thus causing the pressure difference (P1−P2) between the pressures in the upper and lower chambers 7 and 8 of this rear right drive unit 4 to be decreased from the value Prr by an amount corresponding to the value of the longitudinal acceleration b of the vehicle body 3, i.e. corresponding to the decrease in load acting between this rear right wheel 2 and the vehicle body 3. Similarly, this same positive signal of value b.k3 is inverted by the inverter 31 to produce a negative signal Fb of value −b.k3 which is supplied to the adder 15 of the drive unit 4 of the servo actuator 1rl for the rear left wheel 2, thus causing the pressure difference (P1−P2) between the pressures in the upper and lower chambers 7 and 8 of this rear left drive unit 4 to be similarly decreased from the value Prl, again by an amount corresponding to the value of the longitudinal acceleration b of the vehicle body 3, i.e. corresponding to the decrease in load acting between this rear left wheel 2 and the vehicle body 3. This operation of the front and the rear drive units 4 thus substantially prevents the vehicle from undergoing nose diving action during this deceleration condition.

In the case of a combination of these operational conditions, i.e. if simultaneously the vehicle is accelerating or is decelerating and/or is turning around a curve and/or is subjected to a gust of wind, then the pressure differeces (P1−P2) between the pressures in the upper and lower chambers 7 and 8 of each of the drive units 4 are controlled by a combination of the actions explained above, as will be easily understood by one of ordinary skill in the relevant art based upon the foregoing explanations, so as to minimize the lurching effects on the vehicle body of these operational conditions. In other words, according to this first preferred embodiment of the present invention, whether the vehicle is accelerating, is decelerating, is turning around a curve, or is subjected to a side wind, and in all these individual operational conditions or in any combination of them, the vehicle body is stabilized against any relatively large swaying or tilting movements, and against squat and nose diving, and thus relatively large deviations of the attitude of the vehicle body from the ideal or preset attitude are prevented, thus improving the ride comfort and the drivability of the vehicle. Furthermore, as explained hereinabove, according to this first preferred embodiment, the steering characteristics of the vehicle can be tailored to be neutral, or to provide understeer or oversteer, as desired.

Figure 4:
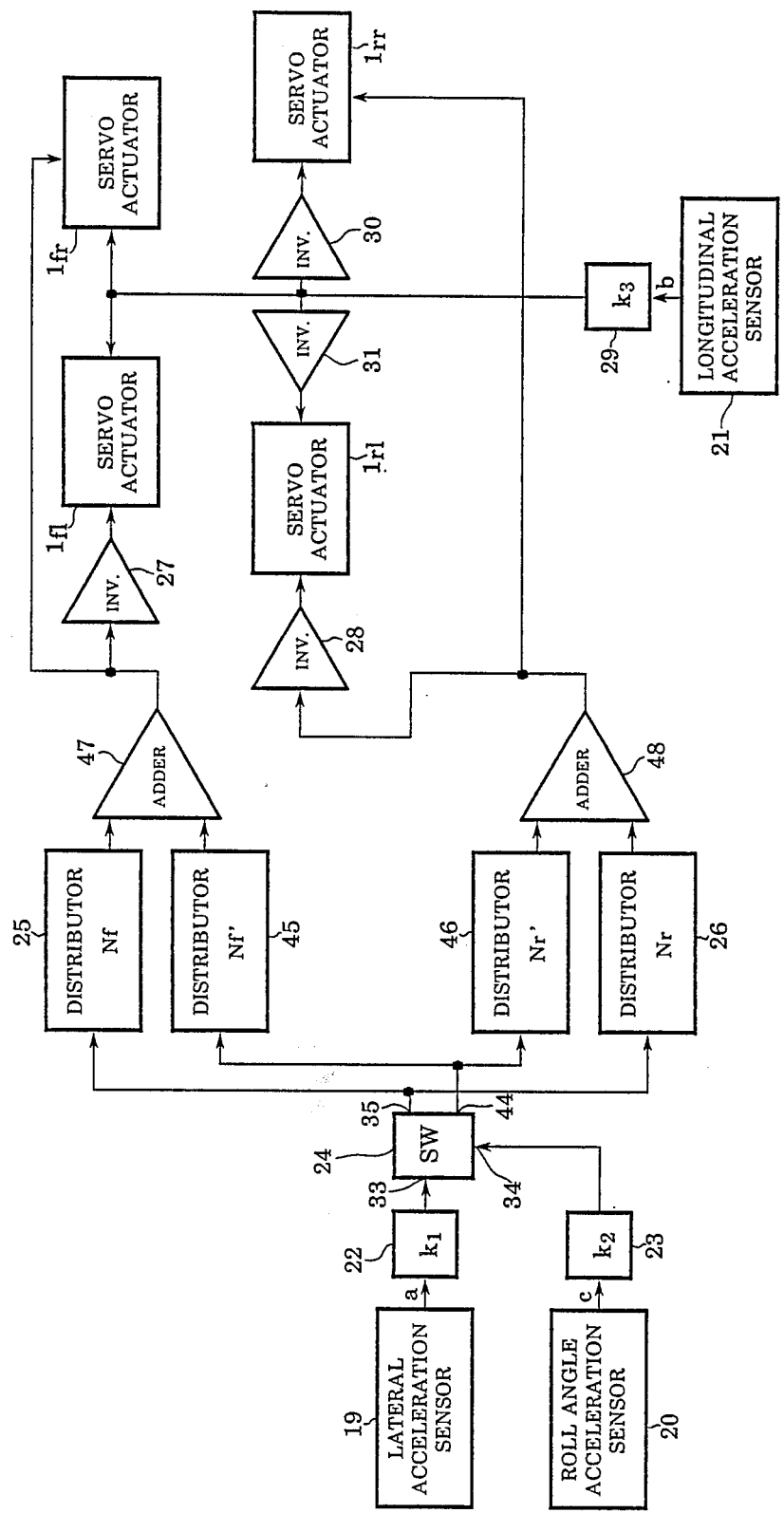
FIG. 4 is a block diagram, similar to FIG. 1, showing the overall construction of the second preferred embodiment of the suspension system of the present invention.
Figure 5:
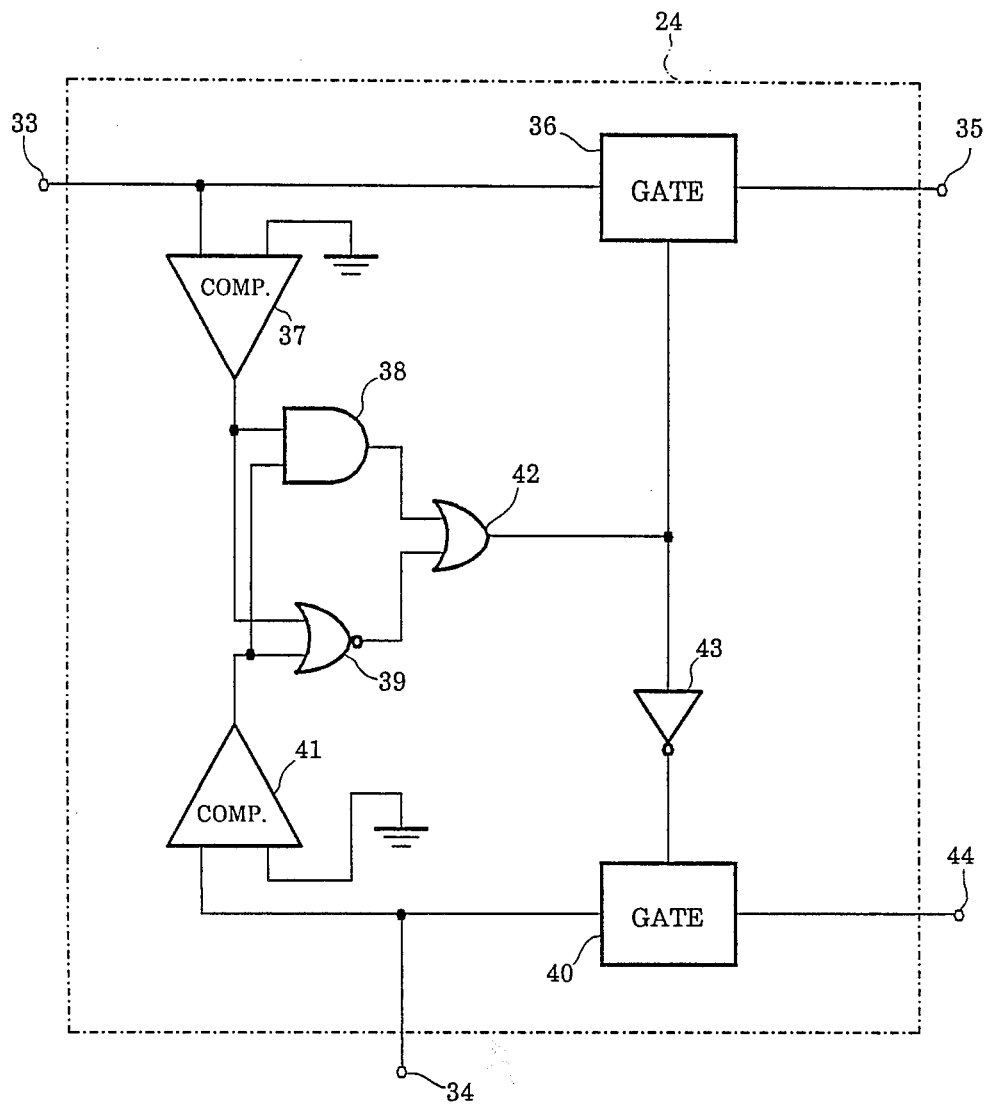
FIG. 5 is a block diagram, similar to FIG. 3, showing the detailed construction of a changeover switch in this second preferred embodiment which is again shown in FIG. 4 only as a block.

Now, with reference to FIGS. 4 and 5, the second preferred embodiment of the suspension system of the present invention will be described. The arrangements relating to the construction of the drive units 4 for the suspension of the vehicle wheels 2, in this second preferred embodiment, are quite the same as in the first preferred embodiment, and accordingly FIG. 2 appllies to this second embodiment as well as to the first. However, the overall construction of this second preferred embodiment, as shown in FIG. 4, is rather different from the first, and so are the associated structure and function of the changeover switch 24.

Referring to FIG. 4, again, 19 is a lateral acceleration sensor, 20 is a roll angle acceleration sensor, and 21 is a longitudinal acceleration sensor, all being provided at locations at or close to the center of gravity of the vehicle body. As before: the lateral acceleration sensor 19 detects the current value of the lateral acceleration of the vehicle and outputs a signal "a" representative thereof; the roll angle acceleration sensor 20 detects the current value of the roll angle acceleration of the vehicle and outputs a signal "c" representative thereof; and the longitudinal acceleration sensor 21 detects the current value of the longitudinal acceleration of the vehicle and outputs a signal "b" representative thereof. In the shown second preferred embodiment, again, these signals are electrical voltage signals, and the meanings and polarities of these signals "a", "c", and "b" are as before.

The signals a and b respectively outputted from the lateral acceleration sensor 19 and from the roll angle acceleration sensor 20 are respectively multiplied by the factors k1 and k2 in amplifiers 22 and 23 respectively, to produce signals of values a.k1 and c.k2 respectively, and these resultant signals are inputted to terminals 33 and 34 of a changeover switch 24. This changeover switch 24, as will be explained in detail hereinbelow, passes selectively one of these input signals while intercepting the other, and the selected signal is then fed either to the inputs of two distributors 25 and 26 or to the inputs of two other distributors 45 and 46, according as to which signal was selected. These arrangements are is in contrast to the first preferred embodiment.

The distributors 25 and 26 cooperate so as to distribute any signal inputted to them both as output signals with a voltage ratio Nf:Nr, where Nf and Nr are both positive and Nf+Nr=1. On the other hand, the distributors 45 and 46 cooperate so as to distribute any signal inputted to them both as output signals with a voltage ratio Nf':Nr', where similarly Nf' and Nr' are both positive and Nf'+Nr'=1. The output signal of the distributor Nf and the output signal of the distributor Nf' are both fed to be input to an adder 47; actually, one and only one of these two output signals is present at any time, as will be understood from the following descriptions. Similarly, the output signal of the distributor Nr and the output signal of the distributor Nr' are both fed to be input to an adder 48, and again one and only one of these two output signals is present at any time.

The output signal of the adder 47 is fed directly to the servo actuator 1fr for the front right vehicle wheel (actually as an input to an add terminal of the adder 15 thereof) and also via an inverter or NOT gate 27 to the servo actuator 1fl for the front left vehicle wheel (again, actually, as an input to an add terminal of the adder 15 thereof). And, similarly, the output signal of the adder 48 is fed directly to the servo actuator 1rr for the rear right vehicle wheel (similarly, actually as an input to an add terminal of the adder 15 thereof) and also via an inverter 28 to the servo actuator 1rl for the rear left vehicle wheel (yet again, actually as an input to an add terminal of the adder 15 thereof). In other words, the output signal of the adder 47 is equal either to Nf.a.k1 or to Nf'.c.k2, depending upon the setting of the changeover switch 24, while the output signal of the distributor Nr is similarly equal either to Nr.a.k1 or to Nr'.c.k2; and accordingly, if the changeover switch 24 is set so as to pass the signal from the lateral acceleration sensor 19 while intercepting the signal from the roll angle acceleration sensor 20, then the signal fed to the plus terminal of the adder 15 of the servo actuator 1fr for the front right vehicle wheel is equal to Nf.a.k1, the signal fed to the plus terminal of the adder 15 of the servo actuator 1fl for the front left vehicle wheel is equal to $-$Nf.a.k1, the signal fed to the plus terminal of the adder 15 of the servo actuator 1rr for the rear right vehicle wheel is equal to Nr.a.k1, and the signal fed to the plus terminal of the adder 15 of the servo actuator 1rl for the rear left vehicle wheel is equal to $-$Nr.a.k1. On the other hand, if the changeover switch 24 is set the other way, so as to intercept the signal from the lateral acceleration sensor 19 while passing the signal from the roll angle acceleration sensor 20, then the signal fed to the plus terminal of the adder 15 of the servo actuator 1fr for the front right vehicle wheel is equal to Nf'.c.k2, the signal fed to the plus terminal of the adder 15 of the servo actuator 1fl for the front left vehicle wheel is equal to $-$Nf'c.k2, the signal fed to the plus terminal of the adder 15 of the servo actuator 1rr for the rear right vehicle wheel is equal to Nr'.c.k2, and the signal fed to the plus terminal of the adder 15 of the servo actuator 1rl for the rear left vehicle wheel is equal to $-$Nr'.c.k2. In any case, this value inputted to this plus terminal of each adder 15 is that input thereto designated as "Fa or Fc" in FIG. 2.

Further, the signal outputted from the longitudinal acceleration sensor 21 is, as before, multiplied by the factor k3 in an amplifier 29, to produce a signal of value b.k3, and this resultant signal is directly inputted to another plus terminal of each of the two adders 15 of the servo actuators 1fr for the front right vehicle wheel and 1fl for the front left vehicle wheel, while further said signal, after being inverted by the inverters 30 and 31 respectively, is inputted to another plus terminal of each of the two adders 15 of the servo actuators 1rr for the rear right vehicle wheel and 1rl for the rear left vehicle wheel. In any case, this value inputted to this plus terminal of each adder 15 is that input thereto designated as "Fb" in FIG. 2.

As before, to another plus terminal of each of the adders 15 for the four servo actuators 1fr, 1fl, 1rr, and 1rl for the four vehicle wheels, there is supplied a constant voltage signal F0 (the value of F0 varies between the vehicle wheels) of magnitude corresponding to the portion of the weight of the vehicle which is imposed on the corresponding wheel 2 when the vehicle is stationary or moving at a constant velocity and is level, i.e. to the value Pfr, Pfl, Prr, and Prl respectively corresponding to the front right wheel, the front left wheel, the rear right wheel, and the rear left wheel; and these constant voltage signals may be generated by a constant voltage generating means of a per se known sort, as also holds for the first preferred embodiment described above.

As in the first preferred embodiment, these various components constitute a calculating control system which, as will be described in detail hereinbelow, functions by calculating, based upon the output signals from the lateral acceleration sensor 19, the roll angle acceleration sensor 20, and the longitudinal acceleration sensor 21 and the load sensors 17 for the four wheels, the fluctuation in load acting between each vehicle wheel 2 and the body 3 of the vehicle due to the acceleration of the vehicle body, and, based upon the results of these calculations, outputs appropriate control signals to the four electrical-hydraulic servo valves 12. The amplification factors k1, k2, and k3 appropriate for the amplifiers 22, 23, and 29 are constants which may be determined in any particular practical example by calculation or by experiment.

Now, the details of the structure and function of the changeover switch 24 of this second preferred embodiment will be explained, with reference to the block diagram thereof shown in FIG. 5. This switch 24 has four terminals 33, 34, 35, and 44. The terminal 33 is connected to the output of the amplifier 22, the terminal 34 is connected to the output of the amplifier 23, the terminal 35 is connected to the inputs of the distributors 25 and 26, and the terminal 44 is connected to the inputs of the distributors 45 and 46. The signal inputted to the input terminal 33 from the amplifier 22 is inputted to a gate 36 and to a comparator 37. Similarly, the signal inputted to the input terminal 34 from the amplifier 23 is inputted to a gate 40 and to a comparator 41. The other inputs of the comparators 37 and 41 are supplied with a standard voltage for comparison of said input signals therewith; in the shown second preferred embodiment, this voltage again is just ground voltage. The output of the comparator 37 is fed both to an input terminal of an AND gate 38 and also to an input terminal of a NOR gate 39. Similarly, the output of the other comparator 41 is fed both to the other input terminal of said AND gate 38 and also to the other input terminal of said NOR gate 39. The outputs of said AND gate 38 and said NOR gate 39 are fed to the inputs of an OR gate 42, whose output is fed directly to control the gate 36 and via an inverter or NOT gate 43 to control the other gate 40. Thus it is seen that exactly one of the two gates 36 and 40 is open at any time. The outputs of the two gates 36 and 40 are not coupled together, in this second preferred embodiment, but are fed, respectively, to the output terminal 35 to be supplied to the inputs of the distributors 25 and 26, and to the output terminal 44 to be supplied to the inputs of the distributors 45 and 46.

This changeover switch 24 operates as will now be explained, to feed the signal received at one and only one of the input terminals 33 and 34 to the output terminal 35 and thence to the distributors 25 and 26, or to the output terminal 44 and thence to the distributors 45 and 46. The signal from the amplifier 22 input through the input terminal 33 is compared with a signal of zero voltage value in the comparator 37, and, if and only if said input signal is greater than said zero signal (i.e. is positive) then the output of said comparator 37 is a ON signal. Similarly, the signal from the amplifier 23 input through the input terminal 34 is compared with a signal of zero voltage value in the comparator 41, and, if and only if said input signal is greater than said zero signal (i.e. is positive) then the output of said comparator 41 is a ON signal. The output signals from the two comparators 37 and 41 are fed as input signals to the AND gate 38, and only in the case that both said output signals are ON is an ON signal outputted from said AND gate 38. Similarly, said output signals from said two comparators 37 and 41 are likewise fed as input signals to the NOR gate 39, and only in the case that both said output signals are OFF is an ON signal outputted from said NOR gate 39. Accordingly, only in the case that the signs of both the input signals fed to the input terminals 33 and 34 of this changeover switch 24 are the same, i.e. that said input signals are both positive or are both negative, is either of the two inputs of the OR gate 42 provided with an ON signal. Thus, when the signs of both the input signals fed to the input terminals 33 and 34 agree, the output of the OR gate 42 is an ON signal, and this causes the gate 36 to be opened while, because of the inverting action of the NOT gate 43, the other gate 40 is closed. In this case, the input signal fed to the input terminal 33 is supplied to the output terminal 35, while the input signal fed to the other input terminal 34 is intercepted. On the other hand, when the signs of the input signals fed to the input terminals 33 and 34 disagree, one being positive and the other negative, the output of the OR gate 42 is an OFF signal, and this causes the gate 36 to be closed while the other gate 40 is opened. In this case, the input signal fed to the input terminal 34 is supplied to the other output terminal 44, while the input signal fed to the input terminal 33 is intercepted.

Thus, in summary, this changeover switch 24 supplies the signal of value a.k1 from the output of the amplifier 22 to the inputs of the distributors 25 and 26, when the sign of the signal from the lateral acceleration sensor 19 and the sign of the signal from the roll angle acceleration sensor 20 agree, and on the other hand supplies the signal of value c.k2 from the output of the amplifier 23 to the inputs of the other distributors 45 and 46, when the sign of said signal from said lateral acceleration sensor 19 and the sign of said signal from said roll angle acceleration sensor 20 differ.

As before, as shown in FIG. 2, the adder 15 for the drive unit 4 for each of the vehicle wheels 2: (a) receives at its minus terminal the signal F of voltage magnitude corresponding to the actual load force acting between said one of said drive units 4 and said vehicle body, i.e. the amount of load currently being borne by the corresponding vehicle wheel 2, outputted by the corresponding load sensor 17; and further receives at its three plus terminals: (b) the signal F0 of voltage magnitude corresponding to the portion of the weight of the vehicle which is imposed on the corresponding wheel 2 when the vehicle is stationary; (c) the signal Fb which is equal to either plus or minus the value b.k3, according as to which wheel is involved, as explained above; and (d) the signal "Fa or Fc", which, according as to whether or not the signs of the values a and c for the vehicle lateral acceleration and the vehicle roll angle acceleration agree or not, either is equal to either plus or minus either the value Nf.a.k1 or the value Nr.a.k1 according as to which wheel is involved, or alternatively is equal to either plus or minus either the value Nf'c.k2 or the value Nr'.c.k2 again according as to which wheel is involved. Again, the pressure difference (P1−P2) between the pressures in the upper and lower chambers 7 and 8 of each drive unit 4 for each vehicle wheel 2 is controlled by a feedback process, so as to bring the value F to be equal to Fb+F0+"Fa or Fc" (as above for the relevant wheel). And, as before, in an alternative possible embodiment not particularly discussed herein, the control of F could be performed by open loop control, and in such a case the load sensor 17 and the input path for the signal F0 could be omitted.

Now, the operation of this second preferred embodiment of the present invention in various different operational circumstances will be explained in brief, since it is quite similar to the operation of the first preferred embodiment, with some crucial changes however. The important difference over the first preferred embodiment is that the optimum steering characteristics for the vehicle, when it is turning around a curve, and when it is subjected to a gust of wind from the side, can be set mutually independently.

As before, if the vehicle is stationary or is moving at a constant velocity, then the lateral acceleration, the roll angle acceleration, and the longitudinal acceleration of the vehicle body 3 are all zero, and the attitude of the vehicle body is maintained in a predetermined appropriate state. Again if, in this operational condition while the vehicle is running at a constant velocity, one of the wheels runs over a bump, then the force received by said wheel from the road surface will temporarily change; but in this case, still, the supporting force for the vehicle body is maintained constant. Therefore, as before, the vertical position of the portion of the vehicle body 3 to which this wheel 2 is mounted will not substantially change, and accordingly the attitude of the vehicle will remain in its abovementioned predetermined appropriate state.

Next, the case that the vehicle is turning around a curve will be explained. As explained with regard to the first preferred embodiment, in this case, the signs of the output signals from the amplifiers 22 and 23 of the FIG. 4 structure which are input to the changeover switch 24 will be the same, and therefore in this case the signal Fa based upon the signal a outputted from the lateral acceleration sensor 19 is inputted via the distributors 25 and 26 after appropriate modification thereby in the ratio Nf:Nr to the adder of each of the servo actuators 1, with as explained above its sign being reversed for the servo actuators 1fl and 1rl while being left undisturbed for the servo actuators 1fr and 1rr; while on the other hand the signal Fc which is based upon the signal c outputted from the roll angle acceleration sensor 20 is intercepted. The detailed description will be omitted since it is the same as in the case of the first preferred embodiment; thus, it will be clear that anti roll action for the vehicle is obtained, based upon the value of the vehicle lateral acceleration as detected by the sensor 19 therefor. By setting the distribution ratio between the signals from the distributors 25 and 26, i.e. the ratio Nf:Nr, appropriately, it is possible appropriately to tailor the steering characteristics of the vehicle while it is turning. Specifically, as before, if this ratio Nf:Nr is set equal to unity, then the vehicle steering characteristics will be substantially neutral; if this ratio Nf:Nr is set equal to greater than unity, then the vehicle steering characteristics will be those of understeer; and, if the ratio Nf:Nr is set equal to less than unity, then the vehicle steering characteristics will be those of oversteer.

Next, the case that the vehicle is subjected to a relatively strong sideways force such as a gust of wind will be explained. As explained with regard to the first preferred embodiment, in this case, the signs of the output signals from the amplifiers 22 and 23 of the FIG. 4 structure which are input to the changeover switch 24 will be opposite, and therefore in this case the signal Fc based upon the signal c outputted from the roll angle acceleration sensor 20 is inputted via the distributors 45 and 46 after appropriate modification thereby in the ratio Nf':Nr' to the adder of each of the servo actuators 1, with as explained above its sign being reversed for the servo actuators 1fl and 1rl while being left undisturbed for the servo actuators 1fr and 1rr; while on the other hand the signal Fc which is based upon the signal c outputted from the roll angle acceleration sensor 20 is intercepted. The detailed description will be omitted since it is the same as in the case of the first preferred embodiment; thus, it will be clear that anti roll action for the vehicle is again obtained, this time based upon the value of the vehicle roll angle acceleration as detected by the sensor 20 therefor. By setting the distribution ratio between the signals from the distributors 45 and 46, i.e. the ratio Nf':Nr', appropriately, it is possible appropriately to tailor the steering characteristics of the vehicle while it is being blown sideways. Specifically, as before, if this ratio Nf':Nr' is set equal to unity, then the vehicle steering characteristics will be substantially neutral; if this ratio Nf':Nr' is set equal to greater than unity, then the vehicle steering characteristics will be those of understeer; and, if the ratio Nf':Nr' is set equal to less than unity, then the vehicle steering characteristics will be those of oversteer.

The case that the vehicle is accelerating or is decelerating will not be particularly explained, since it is quite the same as in the first preferred embodiment described hereinabove. Similarly, the case of a combination of the above outlined operational circumstances is handled by this second preferred embodiment in the same way as in the case of the first preferred embodiment. The particular merit of this second preferred embodiment is that, since the ratios Nf:Nr and Nf':Nr' can be set quite independently, the steering characteristics for the vehicle when it is turning around a curve can be tailored to be most appropriate by altering the ratio Nf:Nr as is most desirable, and the steering characteristics for the vehicle when it is subjected to a gust of wind from the side can be tailored to be most appropriate by altering the ratio Nf':Nr' as is most desirable, quite mutually independently. This provides an important additional benefit.

Although the present invention has been shown and described in terms of certain preferred embodiments thereof, and with reference to the appended drawings, it should not be considered as being particularly limited thereby. The details of any particular embodiment, or of the drawings, could be varied without, in many cases, departing from the ambit of the present invention. For example, in the case that it is considered from the point of view of engineering design that control of attitude changes of the vehicle body can be performed without discriminating as to whether roll axis attitude change is due to the vehicle being subjected to gusts of wind from the side or to turning around a curve, then the vehicle lateral acceleration sensor or the vehicle roll angle acceleration sensor could be omitted, without departing from the principle of the present invention in its broadest sense, and a construction such that roll of the vehicle body is controlled based upon the signal from only one of these sensors could be adopted. Other possible modifications could be conceived of. Accordingly, the scope of the present invention, and the protection desired to be granted by Letters Patent, are to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. A suspension system for a vehicle comprising a body and a plurality of wheels, comprising:
   a plurality of actuators, each of which supports said body from one of said wheels and is controllable to provide a variable force between said body and said wheels;
   a sensor means for detecting acceleration of said body in lateral directions thereof and for producing a signal representative thereof;
   a sensor means for detecting roll angle acceleration of said body and for producing a signal representative thereof: and
   a control means for inputting said signals representative of said lateral acceleration and said roll angle acceleration of said body from said sensor means, for calculating based thereupon fluctuations in load acting between said wheels and said body caused by said accelerations, and for controlling said actuators to increase or decrease forces provided thereby between said body and said wheels, wherein said control means comprises a means for:
   (a) detecting whether or not the direction of lateral acceleration of said body as determined by said lateral acceleration detecting means is the same as or is the opposite to the direction of roll acceleration of said body as considered for a point above the center of gravity of said vehicles; and for:
   (b) if said directions are the same, calculating, based upon said signal representative of said roll angle acceleration of said body from said sensor means therefor, fluctuations in load acting between said wheels and said body caused by said acceleration, and based thereupon controlling said actuators to increase or decrease forces provided thereby between said body and said wheels; and for:
   (c) if said directions are opposite, calculating, based upon said signal representative of said lateral acceleration of said body from said sensor means therefor, fluctuations in load acting between said wheels and said body caused by said acceleration, and based thereupon controlling said acutators to increase or decrease forces provided thereby between said body and said wheels.

2. A suspension system according to claim 1, wherein said accelerating detecting sensor means comprises a means for detecting acceleration of said vehicle body in the longitudinal direction thereof.

3. A suspension system for a vehicle comprising a body and a plurality of wheels comprising:
   a plurality of actuators, each of which supports said body from one of said wheels and is controllable to provide a variable force between said body and said wheels;
   a sensor means for detecting acceleration of said body in lateral directions thereof and for producing a signal representative thereof; and for detecting roll angle acceleration of said body and for producing a signal representative thereof;
   for each said wheel, load sensor means for detecting the value of the load between said wheel and said body and for outputting a signal representative thereof; and
   a control means for inputting said signals representative of said lateral acceleration and said roll angle acceleration of said body from said sensor means and said signals representative of said lateral acceleration, said roll angle acceleration and said load from said sensor means, for calculating based thereupon fluctuations in load acting between said wheels and said body caused by said accelerations, for controlling said actuators to increase or decrease forces provided thereby between said body and said wheels, and for operating by feedback action by comparing the actual fluctuation in the force between the respective wheel of each said actuator and said body as sensed by said load sensor means for said wheel with the calculated value therefor, and for bringing the difference between said values to be zero wherein said control means comprises a means for:

(a) detecting whether or not the direction of lateral acceleration of said body as determined by said lateral acceleration detecting means is the same as or is the opposite to the direction of roll acceleration of said body as considered for a point above the center of gravity of said vehicle; and for:

(b) if said directions are the same, calculating, based upon said signal representative of said roll angle acceleration of said body from said sensor means therefor, fluctuations in load acting between said wheels and said body caused by said acceleration, and based thereupon controlling said actuators to increase or decrease forces provided thereby between said body and said wheels; and for:

(c) if said directions are opposite, calculating, based upon said signal representative of said lateral acceleration of said body from said sensor means therefor, fluctuations in load acting between said wheels and said body caused by said acceleration, and based thereupon controlling said actuators to increase or decrease forces provided thereby between said body and said wheels.

4. A suspension system according to claim 3, wherein said accelerating detecting sensor means comprises a means for detecting acceleration of said vehicle body in the longitudinal direction thereof.

5. A suspension system for a vehicle comprising a body and two front and two rear wheels, comprising:
a plurality of actuators, each of which supports said body from one of said wheels and is controllable to provide a variable force between said body and said wheels;
a sensor means, comprising a means for detecting acceleration of said vehicle body in the lateral direction thereof and a means for detecting roll angle acceleration of said vehicle body; and
a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels, comprising a means for:

(a) detecting whether or not the direction of lateral acceleration of said body as determined by said lateral acceleration detecting means is the same as or is the opposite to the direction of roll acceleration of said body as considered for a point above the center of gravity of said vehicle; and for:

(b) if said directions are the same, calculating, based upon said signal representative of said roll angle acceleration of said body from said sensor means therefor, the magnitude of the total fluctuation in load acting between said front and said rear wheels on each side and said body caused by said acceleration, performing a distribution calculation on said total fluctuation between said front and said rear wheels according to a certain ratio, and based thereupon controlling said actuators to increase or decrease forces provided thereby between said body and said wheels; and for:

(c) if said directions are opposite, calculating, based upon said signal representative of said lateral acceleration of said body from said sensor means therefor, the magnitude of the total fluctuation in load acting between said wheels and said body caused by said acceleration, performing a distribution calculation on said total fluctuation between said front and said rear wheels according to said certain ratio, and based thereupon controlling said actuators to increase or decrease forces provided thereby between said body and said wheels.

6. A suspension system for a vehicle comprising a body and two front and two rear wheels, comprising:
a plurality of actuators, each of which supports said body from one of said wheels and is controllable to provide a variable force between said body and said wheels;
a sensor means, comprising a means for detecting acceleration of said vehicle body in the lateral direction thereof and a means for detecting roll angle acceleration of said vehicle body; and
a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels, comprising a means for:

(a) detecting whether or not the direction of lateral acceleration of said body as determined by said lateral acceleration detecting means is the same as or is the opposite to the direction of roll acceleration of said body as considered for a point above the center of gravity of said vehicle; and for:

(b) if said directions are the same, calculating, based upon said signal representative of said roll angle acceleration of said body from said sensor means therefor, the magnitude of the total fluctuation in load acting between said front and said rear wheels on each side and said body caused by said acceleration, performing a distribution calculation on said total fluctuation between said front and said rear wheels according to a certain ratio, and based thereupon controlling said actuators to increase or decrease forces provided thereby between said body and said wheels, operating by feedback action by comparing the actual fluctuation in the force between the respective wheel of each said actuator and said body as sensed by said load sensor means for said wheel with the calculated value therefor, and bringing the difference between said values to be zero; and for:

(c) if said directions are opposite, calculating, based upon said signal representative of said lateral acceleration of said body from said sensor means therefor, the magnitude of the total fluctuation in load acting between said wheels and said body caused by said acceleration, performing a distribution calculation on said total fluctuation between said front and said rear wheels according to said certain ratio, based thereupon controlling said actuators to increase or decrease forces provided thereby between said body and said wheels, operating by feedback action by comparing the actual fluctuation in the force between the respective wheel of each said actuator and said body as sensed by said load sensor means for said wheel with the calculated value therefor, and bringing the difference between said values to be zero.

7. A suspension system according to claim 5 or claim 6, wherein said certain ratio is substantially equal to unity.

8. A suspension system according to claim 5 or claim 6, wherein said certain ratio is substantially greater than unity.

9. A suspension system according to claim 5 or claim 6, wherein said certain ratio is substantially less than unity.

10. A suspension system for a vehicle comprising a body and two front and two rear wheels, comprising:
   a plurality of actuators, each of which supports said body from one of said wheels and is controllable to provide a variable force between said body and said wheels;
   a sensor means, comprising a means for detecting acceleration of said vehicle body in the lateral direction thereof and a means for detecting roll angle acceleration of said vehicle body; and
   a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels, comprising a means for:
   (a) detecting whether or not the direction of lateral acceleration of said body as determined by said lateral acceleration detecting means is the same as or is the opposite in the direction of roll acceleration of said body as considered for a point above the center of gravity of said vehicle; and for:
   (b) if said directions are the same, calculating, based upon said signal representative of said roll angle acceleration of said body from said sensor means therefor, the magnitude of the total fluctuation in load acting between said front and said rear wheels on each side and said body caused by said acceleration, performing a distribution calculation on said total fluctuation between said front and said rear wheels according to a first ratio, and based thereupon controlling said actuators to increase or decrease forces provided thereby between said body and said wheels; and for:
   (c) if said directions are opposite, calculating, based upon said signal representative of said lateral acceleration of said body from said sensor means therefor, the magnitude of the total fluctuation in load acting between said wheels and said body caused by said acceleration, performing a distribution calculation on said total fluctuation between said front and said rear wheels according to a second ratio, and based thereupon controlling said actuators to increase or decrease forces provided thereby between said body and said wheels.

11. A suspension system for a vehicle comprising a body and two front and two rear wheels, comprising:
   a plurality of actuators, each of which supports said body from one of said wheels and is controllable to provide a variable force between said body and said wheels;
   a sensor means, comprising a means for detecting acceleration of said vehicle body in the lateral direction thereof and a means for detecting roll angle acceleration of said vehicle body; and
   a control means for inputting said signal representative of said acceleration of said body from said sensor means, for calculating based thereupon fluctuations in load acting between said wheels and said body caused by said acceleration, and for controlling said actuators to increase or decrease forces provided thereby between said body and said wheels, comprising a means for:
   (a) detecting whether or not the direction of lateral acceleration of said body as determined by said lateral acceleration detecting means is the same as or is the opposite to the direction of roll acceleration of said body as considered for a point above the center of gravity of said vehicle; and for:
   (b) if said directions are the same, calculating, based upon said signal representative of said roll angle acceleration of said body from said sensor means therefor, the magnitude of the total fluctuation in load acting between said front and said rear wheels on each side and said body caused by said acceleration, performing a distribution calculation on said total fluctuation between said front and said rear wheels according to a first ratio, and based thereupon controlling said actuators to increase or decrease forces provided thereby between said body and said wheels, operating by feedback action by comparing the actual fluctuation in the force between the respective wheel of each said actuator and said body as sensed by said load sensor means for said wheel with the calculated value therefor, and bringing the difference between said values to be zero; and for:
   (c) if said directions are opposite, calculating, based upon said signal representative of said lateral acceleration of said body from said sensor means therefor, the magnitude of the total fluctuation in load acting between said wheels and said body caused by said acceleration, performing a distribution calculation on said total fluctuation between said front and said rear wheels according to a second ratio, based thereupon controlling said actuators to increase or decrease forces provided thereby between said body and said wheels, operating by feedback action by comparing the actual fluctuation in the force between the respective wheel of each said actuator and said body as sensed by said load sensor means for said wheel with the calculated value therefor, and bringing the difference between said values to be zero.

12. A suspension system according to claim 10 or claim 11, wherein said first and said second ratio are substantially different.

* * * * *